United States Patent
Hayashida

(10) Patent No.: US 10,196,515 B2
(45) Date of Patent: Feb. 5, 2019

(54) GLASS-FIBER-REINFORCED POLYCARBONATE RESIN COMPOSITION

(71) Applicant: TEIJIN LIMITED, Osaka (JP)

(72) Inventor: Atsushi Hayashida, Chiba (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 14/775,786

(22) PCT Filed: Mar. 17, 2014

(86) PCT No.: PCT/JP2014/057954
§ 371 (c)(1),
(2) Date: Sep. 14, 2015

(87) PCT Pub. No.: WO2014/148641
PCT Pub. Date: Sep. 25, 2014

(65) Prior Publication Data
US 2016/0024301 A1    Jan. 28, 2016

(30) Foreign Application Priority Data
Mar. 21, 2013  (JP) ................................. 2013-058253

(51) Int. Cl.
| | |
|---|---|
| *C08L 69/00* | (2006.01) |
| *C08L 83/10* | (2006.01) |
| *B29C 45/00* | (2006.01) |
| *C08J 5/04* | (2006.01) |
| *C08G 77/448* | (2006.01) |
| *C08K 5/5399* | (2006.01) |
| *C08K 7/14* | (2006.01) |
| *C08L 27/18* | (2006.01) |
| *C08L 33/06* | (2006.01) |
| *C08K 5/521* | (2006.01) |
| *B29K 69/00* | (2006.01) |

(52) U.S. Cl.
CPC .......... *C08L 69/00* (2013.01); *B29C 45/0005* (2013.01); *C08J 5/043* (2013.01); *C08L 83/10* (2013.01); *B29K 2069/00* (2013.01); *C08G 77/448* (2013.01); *C08J 2369/00* (2013.01); *C08L 2205/03* (2013.01)

(58) Field of Classification Search
CPC ..... C08G 77/448; C08J 5/043; C08J 2369/00; C08L 69/00; C08L 83/10; C08L 2205/03; B29C 45/0005; B29K 2069/00
USPC ..................................... 523/452, 451; 525/55
See application file for complete search history.

(56) References Cited

U.S. PATENT DOCUMENTS

| | | | |
|---|---|---|---|
| 4,224,215 A | 9/1980 | Macke | |
| 2006/0074156 A1* | 4/2006 | Ebeling | C08L 69/00 524/115 |
| 2008/0004397 A1* | 1/2008 | An | C08L 69/00 525/67 |
| 2009/0036593 A1* | 2/2009 | DeRudder | C08L 55/02 524/506 |
| 2011/0028615 A1* | 2/2011 | Li | C08L 69/00 524/140 |
| 2011/0077332 A1* | 3/2011 | Tomoda | C08F 259/08 524/165 |

FOREIGN PATENT DOCUMENTS

| | | | | |
|---|---|---|---|---|
| JP | 55-160052 | | 12/1980 | |
| JP | 2-173061 | | 7/1990 | |
| JP | 7-26149 | | 1/1995 | |
| JP | 2004-256581 | | 9/2004 | |
| JP | 2007-114264 | | 5/2007 | |
| JP | 2007211157 A | * | 8/2007 | .............. C08L 69/00 |
| JP | 2009-280636 | | 12/2009 | |
| JP | 2010-47631 | | 3/2010 | |
| JP | 2010-275346 | | 12/2010 | |
| JP | 2011-16901 | | 1/2011 | |
| JP | 2012-116915 | | 6/2012 | |
| JP | 2012-188578 | | 10/2012 | |
| JP | 2014-55231 | | 3/2014 | |

(Continued)

OTHER PUBLICATIONS

Furuya, JP 2007-211157 A machine translation in Engliish, Aug. 23, 2007.*

(Continued)

*Primary Examiner* — David T Karst
(74) *Attorney, Agent, or Firm* — Wenderoth, Lind & Ponack, L.L.P.

(57) ABSTRACT

A glass-fiber-reinforced polycarbonate resin composition comprising:

(A) 100 parts by weight of a resin component consisting of a polycarbonate-polydiorganosiloxane copolymer resin and an aromatic polycarbonate resin;

(B) 10-300 parts by weight of glass fibers having a flat cross section which have an average value of a long diameter of the fiber cross section of 10-50 μm and an average value of a ratio of the long diameter to a short diameter (long diameter/short diameter) of 1.5-8;

(C) 5-25 parts by weight of an adhesion improving agent, which is at least one resin selected from the group consisting of a phenoxy resin, an epoxy resin, a glycidyl methacrylate resin, a polybutylene terephthalate resin, a polyethylene terephthalate resin and a polyarylate resin;

(D) 5-45 parts by weight of a phosphorus-based flame retardant; and (E) 0.01-3 parts by weight of a fluorine-containing dripping inhibitor, wherein the polydiorganosiloxane is 0.05-4.00 wt % in the composition.

13 Claims, No Drawings

(56) References Cited

FOREIGN PATENT DOCUMENTS

WO    2011/155490    12/2011

OTHER PUBLICATIONS

International Preliminary Report on Patentability dated Sep. 22, 2015 in International (PCT) Application No. PCT/JP2014/057954.
International Search Report dated Jun. 10, 2014 in International (PCT) Application No. PCT/JP2014/057954.
Supplementary European Search Report dated Mar. 1, 2016 in corresponding European Application No. 14769671.0.
Römpp, "Trimethylphosphat", Römpp Chemie Lexikon, 20-02991, 2002, XP002754427, p. 1.

\* cited by examiner

GLASS-FIBER-REINFORCED POLYCARBONATE RESIN COMPOSITION

TECHNICAL FIELD

The present invention relates to a resin composition which comprises a polycarbonate resin and has improved weld strength and flame retardancy. More specifically, it relates to a resin composition which comprises a polycarbonate resin reinforced with glass fibers having a flat cross section as a substrate and has excellent stiffness, high weld strength and high flame retarding properties.

The term "weld" as used herein means a boundary line formed when merging parts of two flows of a molten glass-fiber-reinforced polycarbonate resin composition flowing in a cavity are not completely dissolved into each other at the time of merging, and strength deterioration may occur due to the orientation unevenness of glass fibers caused by this weld.

BACKGROUND ART

Since polycarbonate resins are excellent in mechanical strength, electric properties and transparency, they are widely used as engineering plastics in various fields such as electric and electronic equipment and automobiles. As polycarbonate resins having the above characteristic properties, there are known glass-fiber-reinforced polycarbonate resins prepared by adding glass fibers in order to improve mechanical strength and dimensional stability (Patent Document 1). Meanwhile, materials having higher stiffness are now desired as electric and electronic equipment and car goods are becoming smaller in size and lighter in weight. Then, attempts have been made to improve stiffness by increasing the amount of glass fibers but weld strength and flame retardancy are impaired along with an increase in the amount of glass fibers. Therefore, a polycarbonate resin which satisfies all the requirements for stiffness, weld strength and flame retardancy has not been developed yet, and the development of a material having these properties at the same time has been strongly desired.

For example, there is known a resin composition which comprises a polycarbonate resin and glass fibers having a specific cross-sectional shape and has improved flame retardancy (Patent Document 2). However, since this resin composition is not satisfactory in terms of the effect of improving weld strength and flame retardancy, the improvement of these properties is desired.

Various methods for improving mechanical strength and impact resistance both of which are reduced by the addition of glass fibers by introducing a polycarbonate-polyorganosiloxane copolymer into an aromatic polycarbonate resin are now under study (Patent Documents 3 and 4).

A resin composition which comprises an aromatic polycarbonate resin, a polycarbonate-polyorganosiloxane copolymer and glass fibers treated with a specific sizing agent is known (Patent Document 5).

Further, it is proposed to improve weld strength by introducing a polyarylate resin and a compound having a specific functional group into a composition comprising a polyamide resin and glass fibers (Patent Document 6). However, there is not disclosed information which is effective in improving the stiffness, weld strength and flame retardancy of a resin composition.

PRIOR ART DOCUMENTS (Patent Document 1) JP-A 2004-256581
(Patent Document 2) JP-A 2010-275346
(Patent Document 3) JP-A 55-160052
(Patent Document 4) JP-A 2-173061
(Patent Document 5) JP-A 07-26149
(Patent Document 6) JP-A 2010-47631

DISCLOSURE OF THE INVENTION

It is an object of the present invention to provide a resin composition which is excellent in weld strength, flame retardancy and stiffness and a molded article obtained therefrom.

The inventors of the present invention conducted intensive studies to attain the above object and found that the weld strength, flame retardancy and stiffness of a resin composition are improved by adding an adhesion improving agent (component C) to a resin composition comprising a polycarbonate resin and glass fibers having a flat cross section. The present invention was accomplished based on this finding. That is, according to the present invention, the above object is attained by a glass-fiber-reinforced polycarbonate resin composition comprising (A) 100 parts by weight of a resin component (component A) consisting of a polycarbonate-polydiorganosiloxane copolymer resin (component A-1) and an aromatic polycarbonate resin (component A-2), (B) 10 to 300 parts by weight of glass fibers having a flat cross section (component B) which have an average value of the long diameter of the fiber cross section of 10 to 50 µm and an average value of the ratio of the long diameter to the short diameter (long diameter/short diameter) of 1.5 to 8, (C) 5 to 25 parts by weight of an adhesion improving agent (component C), (D) 5 to 45 parts by weight of a phosphorus-based flame retardant (component D) and (E) 0.01 to 3 parts by weight of a fluorine-containing dripping inhibitor (component E), the content of the polydiorganosiloxane derived from the component A-1 in the resin composition being 0.05 to 4.00 wt %.

Further, the present invention is a method of improving the weld strength of a glass-fiber-reinforced polycarbonate resin composition comprising (A) 100 parts by weight of a resin component (component A) consisting of a polycarbonate-polydiorganosiloxane copolymer resin (component A-1) and an aromatic polycarbonate resin (component A-2), (B) 10 to 300 parts by weight of glass fibers having a flat cross section (component B) which have an average value of the long diameter of the fiber cross section of 10 to 50 µm and an average value of the ratio of the long diameter to the short diameter (long diameter/short diameter) of 1.5 to 8, (D) 5 to 45 parts by weight of a phosphorus-based flame retardant (component D) and (E) 0.01 to 3 parts by weight of a fluorine-containing dripping inhibitor (component E), the content of the polydiorganosiloxane derived from the component A-1 in the resin composition being 0.05 to 4.00 wt %, wherein (C) 5 to 25 parts by weight of an adhesion improving agent (component C) is added based on 100 parts by weight of the resin component (component A).

BEST MODE FOR CARRYING OUT THE INVENTION

The present invention will be described in detail hereinunder.
(Component A)
The resin composition of the present invention comprises a resin (component A) consisting of a polycarbonate-polydiorganosiloxane copolymer resin (component A-1) and an aromatic polycarbonate resin (component A-2).

The content of the component A-1 is preferably 0.1 to 100 wt %, more preferably 0.5 to 80 wt %, much more preferably 1 to 60 wt % based on 100 wt % of the component A.

(Component A-1: Polycarbonate-Polydiorganosiloxane Copolymer Resin)

The polycarbonate-polydiorganosiloxane copolymer resin (component A-1) is preferably obtained by reacting a dihydric phenol (I) represented by the following formula (1) with a hydroxylaryl-terminated polydiorganosiloxane (II) represented by the following formula (3).

The component A-1 is preferably a polycarbonate-polydiorganosiloxane copolymer resin composed of a polycarbonate block derived from a dihydric phenol represented by the following formula (1) and a polydiorganosiloxane block derived from a dihydric phenol represented by the following formula (3).

(dihydric phenol (I))

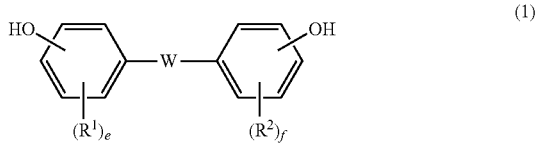

(1)

In the above formula (1), $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group. When there are a plurality of $R^1$'s and a plurality of $R^2$'s, they may be the same or different.

"e" and "f" are each an integer of 1 to 4.

W is a single bond or at least one group selected from the group consisting of groups represented by the following formulas (2).

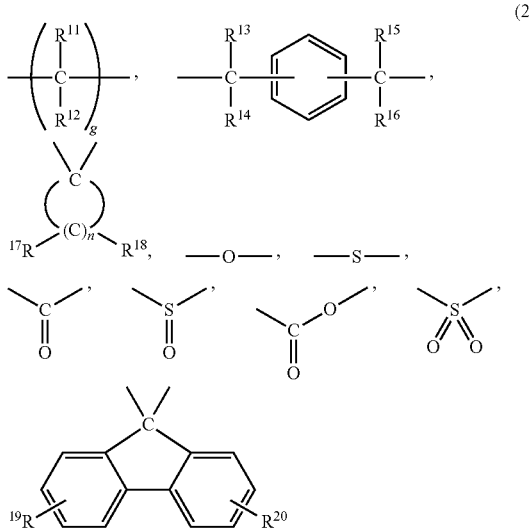

(2)

In the above formulas (2), $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms. Examples of the alkyl group having 1 to 18 carbon atoms of $R^{11}$, $R^{12}$, $R^{13}$, $R^{14}$, $R^{15}$, $R^{16}$, $R^{17}$ and $R^{18}$ include methyl group and ethyl group.

$R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group. When there are a plurality of $R^{19}$'s and a plurality of $R^{20}$'s, they may be the same or different. Examples of the alkyl group having 1 to 18 carbon atoms of $R^{19}$ and $R^{20}$ include methyl group and ethyl group.

"g" is an integer of 1 to 10, and "h" is an integer of 4 to 7.

Examples of dihydric phenol represented by the formula (1) include 4,4'-dihydroxybiphenyl,
bis(4-hydroxyphenyl)methane,
1,1-bis(4-hydroxyphenyl)ethane,
1,1-bis(4-hydroxyphenyl)-1-phenylethane,
2,2-bis(4-hydroxyphenyl)propane,
2,2-bis(4-hydroxy-3-methylphenyl)propane,
1,1-bis(4-hydroxyphenyl)-3,3,5-trimethylcyclohexane,
2,2-bis(4-hydroxy-3,3'-biphenyl)propane,
2,2-bis(4-hydroxy-3-isopropylphenyl)propane,
2,2-bis(3-t-butyl-4-hydroxyphenyl)propane,
2,2-bis(4-hydroxyphenyl)butane,
2,2-bis(4-hydroxyphenyl)octane,
2,2-bis(3-bromo-4-hydroxyphenyl)propane,
2,2-bis(3,5-dimethyl-4-hydroxyphenyl)propane,
2,2-bis(3-cyclohexyl-4-hydroxyphenyl)propane,
1,1-bis(3-cyclohexyl-4-hydroxyphenyl)cyclohexane,
bis(4-hydroxyphenyl)diphenylmethane,
9,9-bis(4-hydroxyphenyl)fluorene,
9,9-bis(4-hydroxy-3-methylphenyl)fluorene,
1,1-bis(4-hydroxyphenyl)cyclohexane,
1,1-bis(4-hydroxyphenyl)cyclopentane,
4,4'-dihydroxydiphenyl ether,
4,4'-dihydroxy-3,3'-dimethyldiphenyl ether,
4,4'-sulfonyldiphenol, 4,4'-dihydroxydiphenyl sulfoxide,
4,4'-dihydroxydiphenyl sulfide,
2,2'-dimethyl-4,4'-sulfonyldiphenol,
4,4'-dihydroxy-3,3'-dimethyldiphenyl sulfoxide,
4,4'-dihydroxy-3,3'-dimethyldiphenyl sulfide,
2,2'-diphenyl-4,4'-sulfonyl diphenol,
4,4'-dihydroxy-3,3'-diphenyldiphenyl sulfoxide,
4,4'-dihydroxy-3,3'-diphenyldiphenyl sulfide,
1,3-bis{2-(4-hydroxyphenyl)propyl}benzene,
1,4-bis{2-(4-hydroxyphenyl)propyl}benzene,
1,4-bis(4-hydroxyphenyl)cyclohexane,
1,3-bis(4-hydroxyphenyl)cyclohexane,
4,8-bis(4-hydroxyphenyl)tricyclo[5.2.1.02,6]decane,
4,4'-(1,3-adamantanediyl)diphenol and
1,3-bis(4-hydroxyphenyl)-5,7-dimethyladamantane.

Out of these,
1,1-bis(4-hydroxyphenyl)-1-phenylethane,
2,2-bis(4-hydroxyphenyl)propane,
2,2-bis(4-hydroxy-3-methylphenyl)propane, 1,1-bis(4-hydroxyphenyl)cyclohexane,
1,1-bis(4-hydroxyphenyl)-3,3,5-trimethylcyclohexane,
4,4'-sulfonyldiphenol,
2,2'-dimethyl-4,4'-sulfonyldiphenol,
9,9-bis(4-hydroxy-3-methylphenyl)fluorene,
1,3-bis{2-(4-hydroxyphenyl)propyl}benzene and
1,4-bis{2-(4-hydroxyphenyl)propyl}benzene are preferred,
and 2,2-bis(4-hydroxyphenyl)propane,
1,1-bis(4-hydroxyphenyl)cyclohexane (BPZ),
4,4'-sulfonyldiphenol and
9,9-bis(4-hydroxy-3-methylphenyl)fluorene are
particularly preferred. 2,2-bis(4-hydroxyphenyl)propane having excellent strength and high durability is most preferred. They may be used alone or in combination of two or more.

(hydroxyaryl-terminated polydiorganosiloxane (II))

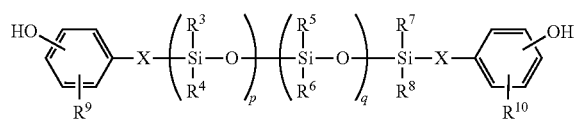

(3)

In the above formula (3), $R^3$, $R^4$, $R^5$, $R^6$, $R^7$ and $R^8$ are each independently a hydrogen atom, alkyl group having 1 to 12 carbon atoms such as methyl group or ethyl group, or substituted or nonsubstituted aryl group having 6 to 12 carbon atoms such as phenol group.

$R^9$ and $R^{10}$ are each independently a hydrogen atom, halogen atom, alkyl group having 1 to 10 carbon atoms such as methyl group or ethyl group, or alkoxy group having 1 to 10 carbon atoms such as methoxy group or ethoxy group.

"p" is a natural number, "q" is 0 or natural number and (p+q) is a natural number of less than 100.

X is a divalent aliphatic group having 2 to 8 carbon atoms. X is preferably an alkylene group having 2 to 8 carbon atoms such as ethylene group, trimethylene group or tetramethylene group.

As the hydroxyaryl-terminated polydiorganosiloxane (II) represented by the formula (3), the following compounds are preferably used.

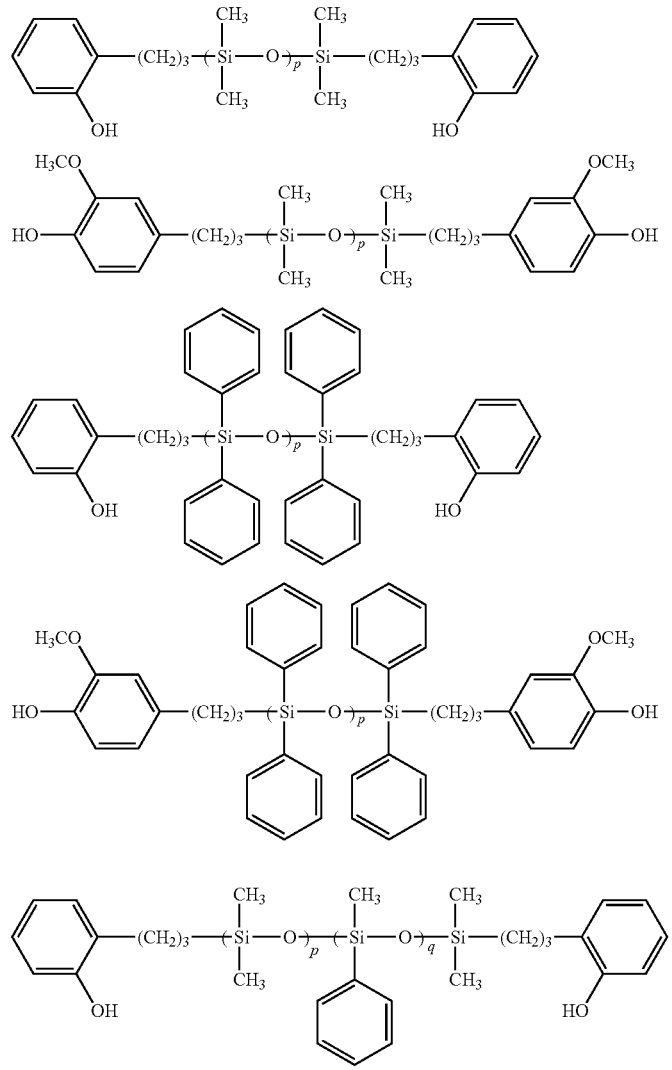

-continued

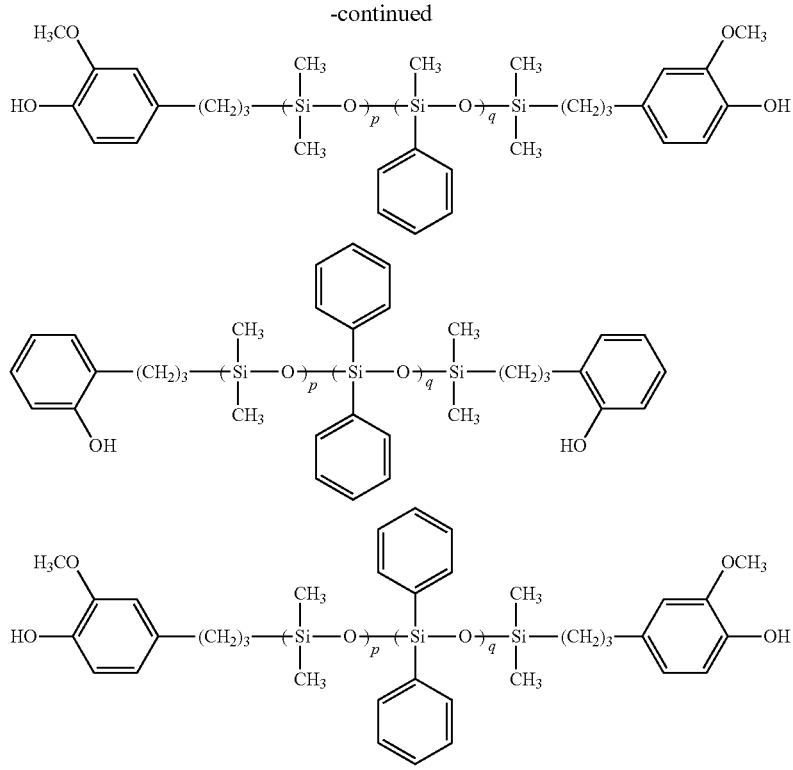

The hydroxyaryl-terminated polydiorganosiloxane (II) is easily produced by carrying out the hydrosilylation reaction of a phenol having an olefinic unsaturated carbon-carbon bond, preferably vinyl phenol, 2-allylphenol, isopropenyl phenol or 2-methoxy-4-allylphenol to the end of a polysiloxane chain having a predetermined polymerization degree. (2-allylphenol)-terminated polydiorganosiloxanes and (2-methoxy-4-allylphenol)-terminated polydiorganosiloxanes are preferred, and (2-allylphenol)-terminated polydimethylsiloxane and (2-methoxy-4-allylphenol)-terminated polydimethylsiloxane are particularly preferred.

The diorganosiloxane polymerization degree (p+q) of the hydroxyaryl-terminated polydiorganosiloxane (II) is preferably less than 100 to attain high transparency. The diorganosiloxane polymerization degree (p+q) is more preferably 5 to 70, much more preferably 20 to 60, particularly preferably 30 to 60, most preferably 35 to 40. Below the lower limit of the above preferred range, flame retardancy and impact resistance degrade, and above the upper limit of the above preferred range, flame retardancy and weld strength are not stably developed.

The content of the polydiorganosiloxane derived from the component A-1 in the resin composition is 0.05 to 4.00 wt %. The content of the polydiorganosiloxane component is preferably 0.05 to 3.00 wt %, more preferably 0.10 to 2.00 wt %, much more preferably 0.10 to 0.90 wt %. Below the lower limit of the above preferred range, flame retardancy is not fully developed, and above the upper limit of the above preferred range, flame retardancy and weld strength are not stably developed. The polymerization degree of the polydiorganosiloxane and the content of the polydiorganosiloxane can be calculated by $^1$H-NMR measurement.

The reason that flame retardancy is developed when the content of the polydiorganosiloxane in the polycarbonate-polydiorganosiloxane copolymer resin falls within the above range is presumed as follows. That is, in general, as the content of the polydiorganosiloxane in the polycarbonate-polydiorganosiloxane copolymer resin increases, the polydiorganosiloxane itself generates a combustion gas to promote combustion, thereby deteriorating flame retardancy. Meanwhile, the polydiorganosiloxane exhibits the effect of promoting the production of a carbide phase during the combustion of a test piece, thereby improving a dripping inhibition effect to improve flame retardancy. When the content of the polydiorganosiloxane falls within the above range, this flame retardancy improving effect surpasses the flame retardancy deteriorating effect, whereby flame retardancy is developed.

In the present invention, hydroxyaryl-terminated polydiorganosiloxanes (II) may be used alone or in combination of two or more.

As long as the method of the present invention is not prevented, a comonomer except for the dihydric phenol (I) and the hydroxyaryl-terminated polydiorganosiloxane (II) may be used in an amount of not more than 10 wt % based on the total weight of the copolymer.

(Production of Polycarbonate-polydiorganosiloxane Copolymer Resin (Component A-1))

The component A-1 may be produced by adding the hydroxyaryl-terminated polydiorganosiloxane (II) represented by the formula (3) to the dihydric phenol (I) after an oligomer of the dihydric phenol (I) is produced to carry out interfacial polycondensation.

(Production of Oligomer of dihydric phenol (I))

A mixed solution containing an oligomer having a terminal chloroformate group is first prepared through a reaction between the dihydric phenol (I) and a carbonate ester forming compound in a mixed solution of a water-insoluble organic solvent and an alkali aqueous solution.

To produce the oligomer of the dihydric phenol (I), the whole amount of the dihydric phenol (I) used in the method of the present invention may be added to the oligomer at a time, or part thereof may be added as a reaction raw material in a post-stage of an interfacial polycondensation reaction as a post-addition monomer. The term "post-addition monomer" means that a monomer is added to accelerate the post-stage of the polycondensation reaction and does not need to be added when not required.

This oligomer production reaction system is not particularly limited but preferably system in which the reaction is carried out in a solvent in the presence of an acid binder. The polymerization degree of the oligomer is preferably 2 to 50, more preferably 5 to 20, much more preferably 10 to 15.

The amount of the carbonate ester forming compound may be suitably adjusted in consideration of the stoichiometric ratio (equivalent) of the reaction. When a gaseous carbonate ester forming compound such as phosgene is used, it is preferably blown into the reaction system.

As the acid binder may be used an alkali metal hydroxide such as sodium hydroxide or potassium hydroxide, an alkali metal carbonate such as sodium carbonate or potassium carbonate, an organic base such as pyridine, or a mixture thereof. The amount of the acid binder may be suitably determined in consideration of the stoichiometric ratio (equivalent) of the reaction likewise. Stated more specifically, 2 equivalents or a little more of the acid binder is preferably used based on the number of moles (1 mole is generally equivalent to 2 equivalents) of the dihydric phenol (I) used for the formation of the oligomer.

As the solvent, solvents which are inactive to reactions such as known solvents used for the production of polycarbonates may be used alone or as a mixture. Typical examples of the solvent include hydrocarbon solvents such as xylene and halogenated hydrocarbon solvents such as methylene chloride and chlorobenzene. Halogenated hydrocarbon solvents such as methylene chloride are particularly preferably used. For the improvement of the transparency of the obtained polycarbonate-polydiorganosiloxane copolymer resin (component A-1), it is effective to reduce the concentration of solid matter. The concentration of the dihydric phenol (I) is not more than 400 g/L, preferably not more than 300 g/L, more preferably not more than 250 g/L. The molar ratio of the water-insoluble organic solvent is preferably not less than 10 mol equivalent, more preferably not less than 14 mol equivalent based on the dihydric phenol (I). By setting the molar ratio of the organic solvent to the above range, even a copolymer comprising a hydroxyaryl-terminated polydiorganosiloxane (II) (p+q>30) having a high siloxane polymerization degree which hardly develops high transparency can provide a polycarbonate-polydiorganosiloxane copolymer resin (component A-1) having high total light transmittance stably.

Although the reaction pressure for producing the oligomer is not particularly limited and may be normal pressure, increased pressure or reduced pressure, the reaction is advantageously carried out under normal pressure. The reaction temperature is selected from a range of −20 to 50° C., and water cooling or ice cooling is desirably carried out as heat is generated by polymerization in most cases. Although the reaction time which is affected by other conditions and cannot be specified unconditionally, it is generally 0.2 to 10 hours. The pH range of the oligomer production reaction is the same as that of a known interfacial reaction and always adjusted to not less than 10.

(Interfacial Polycondensation of Hydroxyaryl-terminated Polydiorganosiloxane (II) and Oligomer)

The polycarbonate-polydiorganosiloxane copolymer resin (component A-1) may be obtained by obtaining a mixed solution containing the oligomer of the dihydric phenol (I) having a terminal chloroformate group, adding the hydroxyaryl-terminated polydiorganosiloxane (II) represented by the formula (3) at a rate of not more than 0.01 mol equivalent/min based on the charged amount of the dihydric phenol (I) while the mixed solution is stirred and carrying out the interfacial polycondensation of the hydroxyaryl-terminated polydiorganosiloxane (II) and the oligomer.

Although the present invention is not limited by any theory, since a mixture of BPA (bisphenol A) and a hydroxyaryl-terminated polydiorganosiloxane is reacted with phosgene in the prior art method, a block copolymer having a long chain composed of only one of the monomers tends to be formed due to the difference in reactivity between BPA and the hydroxyaryl-terminated polydiorganosiloxane. Further, a structure in which the hydroxyaryl-terminated polydiorganosiloxane monomer is bonded through a short-chain BPA oligomer tends to be formed. Meanwhile, since the concentration of the hydroxyaryl-terminated polydiorganosiloxane can be reduced in the present invention, it is considered that a structure in which the hydroxyaryl-terminated polydiorganosiloxane monomer is bonded through the short-chain BPA oligomer is hardly formed. Thereby, it is assumed that a copolymer having high transparency and forming an aggregation structure with small dispersity of polydiorganosiloxane domain sizes is obtained.

When the addition rate of the hydroxyaryl-terminated polydiorganosiloxane (II) is faster than 0.01 mol equivalent/min, the normalized dispersity of polydiorganosiloxane domain sizes dispersed in a molded article of the obtained polycarbonate-polydiorganosiloxane copolymer resin exceeds 40%, thereby deteriorating transparency disadvantageously. When the addition rate of the hydroxyaryl-terminated polydiorganosiloxane (II) is slower than 0.0001 mol equivalent/min, the content of the polydiorganosiloxane component in the obtained copolymer resin becomes low with the result that its molecular weight varies disadvantageously. Therefore, the lower limit of the addition rate of the hydroxyaryl-terminated polydiorganosiloxane (II) is substantially 0.0001 mol equivalent/min. To enhance uniform dispersibility, it is desired that the hydroxyaryl-terminated polydiorganosiloxane (II) should be added in a solution form. The concentration of the solution is desirably low as long as the reaction is not inhibited.

For the interfacial polycondensation reaction, the acid binder may be suitably added in consideration of the stoichiometric ratio (equivalent) of the reaction. As the acid binder, for example, an alkali metal hydroxide such as sodium hydroxide or potassium hydroxide, an alkali metal carbonate such as sodium carbonate or potassium carbonate, an organic base such as pyridine, or a mixture thereof may be used. Stated more specifically, when the hydroxyaryl-terminated polydiorganosiloxane (II) in use or part of the dihydric phenol (I) is added in this reaction stage as a post-addition monomer, 2 equivalents or more of an alkali is preferably used based on the total number of moles (1 mole is generally equivalent to 2 equivalents) of the post-addition dihydric phenol (I) and the hydroxyaryl-terminated polydiorganosiloxane (II).

Polycondensation by an interfacial polycondensation reaction between the oligomer of the dihydric phenol (I) and the hydroxyaryl-terminated polydiorganosiloxane (II) is carried out by stirring the above mixed solution violently. In the polycondensation reaction, an end sealing agent or a molecular weight control agent is generally used. Examples of the end sealing agent include compounds having a monovalent phenolic hydroxyl group such as phenol, p-tert-butylphenol, p-cumylphenol and tribromophenol, long-chain alkyl phenols, aliphatic carboxylic acid chlorides, aliphatic carboxylic acids, hydroxybenzoic acid alkyl esters, hydroxyphenyl alkyl acid esters and alkyl ether phenols. The amount of the end sealing agent is 100 to 0.5 mole, preferably 50 to 2 mole based on 100 mole of the total of all the dihydric phenol-based compounds. Two or more of the above compounds may be used in combination as a matter of course. To promote the polycondensation reaction, a catalyst such as a tertiary amine exemplified by trimethylamine or a quaternary ammonium salt may be added. The reaction time of the polycondensation reaction must be relatively prolonged to improve transparency. It is preferably not less than 30 minutes, more preferably not less than 50 minutes. A small amount of an antioxidant such as sodium sulfide or hydrosulfide may be added as desired.

A branching agent may be used in combination with the above dihydric phenol-based compound to obtain a branched polycarbonate-polydiorganosiloxane. Examples of a polyfunctional aromatic compound having 3 or more functional groups used for the branched polycarbonate-polydiorganosiloxane copolymer resin include phloroglucin, phloroglucide, trisphenols such as
4,6-dimethyl-2,4,6-tris(4-hydroxydiphenyl)heptene-2,
2,4,6-trimethyl-2,4,6-tris(4-hydroxyphenyl)heptane,
1,3,5-tris(4-hydroxyphenyl)benzene,
1,1,1-tris(4-hydroxyphenyl)ethane,
1,1,1-tris(3,5-dimethyl-4-hydroxyphenyl)ethane,
2,6-bis(2-hydroxy-5-methylbenzyl)-4-methylphenol and
4-{4-[1,1-bis(4-hydroxyphenyl)ethyl]benzene}-α,α'-dimethylbenzyl phenol, tetra(4-hydroxyphenyl)methane,
bis(2,4-dihydroxyphenyl)ketone,
1,4-bis(4,4-dihydroxytriphenylmethyl)benzene, or
trimellitic acid, pyromellitic acid,
benzophenonetetracarboxylic acid and acid chlorides thereof.
Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The content of the polyfunctional compound in the branched polycarbonate-polydiorganosiloxane copolymer resin is preferably 0.001 to 1 mol %, more preferably 0.005 to 0.9 mol %, much more preferably 0.01 to 0.8 mol %, particularly preferably 0.05 to 0.4 mol % based on the whole amount of the polycarbonate-polydiorganosiloxane copolymer resin (component A-1). The amount of the branched structure can be calculated by $^1$H-NMR measurement.

The reaction pressure may be reduced pressure, normal pressure or increased pressure but preferably normal pressure or the pressure of reaction system itself. The reaction temperature is selected from a range of −20 to 50° C., and water cooling or ice cooling is desirably carried out as heat is generated by polymerization inmost cases. Since the reaction time differs according to other conditions such as the reaction temperature, it cannot be specified unconditionally but generally 0.5 to 10 hours.

According to circumstances, a polycarbonate-polydiorganosiloxane copolymer resin having a desired reduced viscosity [$\eta_{sp}$/c] may be acquired by carrying out a suitable physical treatment (mixing, fractionating) and/or chemical treatment (polymer reaction, crosslinking, partial decomposition) on the obtained polycarbonate-polydiorganosiloxane copolymer resin (component A-1).

The obtained reaction product (crude product) is subjected to a known post-treatment such as a separation and purification method to collect a polycarbonate-polydiorganosiloxane copolymer resin having a desired purity (degree of purification).

The viscosity average molecular weight (Mv) of the polycarbonate-polydiorganosiloxane copolymer resin (component A-1) is not particularly limited but preferably $1.0 \times 10^4$ to $5 \times 10^4$, more preferably $1.1 \times 10^4$ to $3 \times 10^4$, much more preferably $1.2 \times 10^4$ to $2.4 \times 10^4$. A polycarbonate-polydiorganosiloxane copolymer resin having a viscosity average molecular weight of less than $1 \times 10^4$ cannot obtain satisfactory mechanical properties. A resin composition obtained from a polycarbonate-polydiorganosiloxane copolymer resin (component A-1) having a viscosity average molecular weight of more than $5 \times 10^4$ is inferior in general-applicability as it has poor flowability at the time of injection molding.

The average size of polydiorganosiloxane domains in a molded article of the polycarbonate-polydiorganosiloxane copolymer resin (component A-1) is preferably 1 to 40 nm. The average size is more preferably 1 to 30 nm, much more preferably 5 to 25 nm. Below the lower limit of the preferred range, impact resistance and flame retardancy are not fully developed, and above the upper limit of the preferred range, transparency may not be developed stably. Further, even when the average domain size of the polydiorganosiloxane domains falls within the preferred range, if its normalized dispersity exceeds 40%, transparency may not be developed. The normalized dispersity of the polydiorganosiloxane domain sizes is preferably not more than 40%, more preferably not more than 30%. Thereby, a resin composition which is excellent in transparency, impact resistance and flame retardancy is provided.

The average domain size and normalized dispersity of the polydiorganosiloxane domains of a molded article of the polycarbonate-polydiorganosiloxane copolymer resin (component A-1) were evaluated by a small-angle X-ray scattering (SAXS) method.

The small-angle X-ray scattering method is a method for measuring diffuse scattering and diffraction produced in a small-angle area having a scattering angle (2θ) of less than 10°. In this small-angle X-ray scattering method, when there are areas having a size of about 1 to 100 nm and a difference in electron density in a substance, the diffuse scattering of X-rays is measured due to the electron density difference. The particle diameter of an object to be measured is obtained based on this scattering angle and scattering intensity.

In the case of a polycarbonate-polydiorganosiloxane copolymer resin having an aggregation structure in which polydiorganosiloxane domains are dispersed in the matrix of a polycarbonate polymer, the diffuse scattering of X-rays occurs due to a difference in electron density between the polycarbonate matrix and the polydiorganosiloxane domains. A small-angle X-ray scattering profile is measured by measuring scattering intensity I at each scattering angle (2θ) of less than 10°, and simulation is carried out by using commercially available analyzing software from temporary particle diameter and temporary particle size distribution models based on the assumption that the polydiorganosiloxane domains are spherical domains and there are variations in particle size distribution so as to obtain the average size and particle size distribution (normalized dispersity) of the polydiorganosiloxane domains.

According to the small-angle X-ray scattering method, the average size and particle size distribution of the polydiorganosiloxane domains dispersed in the matrix of the polycarbonate polymer which cannot be accurately measured by observation through a transmission electron microscope can be measured easily and accurately with high reproducibility. The term "average domain size" means the number average of individual domain sizes. The term "normalized dispersity" means a parameter obtained by normalizing the spread of a particle size distribution with the average size. Stated more specifically, it is a value obtained by normalizing the dispersity of polydiorganosiloxane domain sizes with the average domain size and represented by the following equation (1).

$$\text{Normalized dispersity } (\%) = \delta/D_{av} \quad (1)$$

In the above equation (1), $\delta$ is the standard deviation of polydiorganosiloxane domain sizes, and $D_{av}$ is an average domain size.

The terms "average domain size" and "normalized dispersity" as used in association with the present invention are measurement values obtained by measuring a 1.0 mm-thick part of a three-stage plate manufactured by the method described in Examples by the small-angle X-ray scattering method. Analysis was conducted with an isolated particle model which does not take interaction between particles (interference between particles) into consideration.

The total light transmittance of a 2 mm-thick molded article formed from the polycarbonate-polydiorganosiloxane copolymer resin (component A-1) is preferably not less than 88%. The haze of the 2 mm-thick molded article formed from the polycarbonate-polydiorganosiloxane copolymer resin (component A-1) is preferably 0.3 to 20%. The haze is more preferably 0.5 to 10%, much more preferably 0.6 to 5%, particularly preferably 0.7 to 2%.

The term "total light transmittance" as used in association with the present invention indicates the level of transparency and means the ratio of transmitted light to incident light measured by the method E308 of ASTM-D1003-61. The term "haze" as used in association with the present invention indicates the level of transparency and means the percentage (%) of transmitted light deviated from an incident beam by forward scattering when it passes through a test piece (ASTM-D1003-61). That is, as total light transmittance becomes higher and haze becomes lower, transparency becomes higher.

The polycarbonate-polydiorganosiloxane copolymer resin (component A-1) may be mixed with a flame retardant, reinforcing filler and additives which are generally mixed with a polycarbonate resin as long as the effect of the present invention is not impaired.

(Component A-2: Aromatic Polycarbonate Resin)

The aromatic polycarbonate resin (component A-2) is obtained by reacting a dihydric phenol with a carbonate precursor. Examples of the reaction include interfacial polycondensation, melt transesterification, the solid-phase transesterification of a carbonate prepolymer and the ring-opening polymerization of a cyclic carbonate compound.

Typical examples of the dihydric phenol used herein include hydroquinone, resorcinol, 4,4'-biphenyl,
1,1-bis(4-hydroxyphenyl)ethane,
2,2-bis(4-hydroxyphenyl)propane (commonly known as "bisphenol A"), 2,2-bis(4-hydroxy-3-methylphenyl)propane,
2,2-bis(4-hydroxyphenyl)butane,
1,1-bis(4-hydroxyphenyl)-1-phenylethane,
1,1-bis(4-hydroxyphenyl)cyclohexane,
1,1-bis(4-hydroxyphenyl)-3,3,5-trimethylcyclohexane,
2,2-bis(4-hydroxyphenyl)pentane,
4,4'-(p-phenylenediisopropylidene)diphenol,
4,4'-(m-phenylenediisopropylidene)diphenol,
1,1-bis(4-hydroxyphenyl)-4-isopropylcyclohexane,
bis(4-hydroxyphenyl)oxide, bis(4-hydroxyphenyl)sulfide,
bis(4-hydroxyphenyl)sulfoxide,
bis(4-hydroxyphenyl)sulfone, bis(4-hydroxyphenyl)ketone,
bis(4-hydroxyphenyl)ester,
bis(4-hydroxy-3-methylphenyl)sulfide,
9,9-bis(4-hydroxyphenyl)fluorene and
9,9-bis(4-hydroxy-3-methylphenyl)fluorene. Out of these, bis(4-hydroxyphenyl)alkanes are preferred, and bisphenol A is particularly preferred from the viewpoint of impact resistance.

In the present invention, besides bisphenol A-based polycarbonates which are general-purpose polycarbonates, special polycarbonates which are produced by using another dihydric phenol may be used as the component A-2.

For example, polycarbonates (homopolymers or copolymers) obtained from
4,4'-(m-phenylenediisopropylidene)diphenol (may be abbreviated as "BPM" hereinafter),
1,1-bis(4-hydroxyphenyl)cyclohexane,
1,1-bis(4-hydroxyphenyl)-3,3,5-trimethylcyclohexane (may be abbreviated as "Bis-TMC" hereinafter),
9,9-bis(4-hydroxyphenyl)fluorene and
9,9-bis(4-hydroxy-3-methylphenyl)fluorene (may be abbreviated as "BCF" hereinafter) as part or all of the dihydric phenol component are suitable for use in fields in which the requirements for dimensional stability and form stability against water absorption are very strict. These dihydric phenols except for BPA are used in an amount of preferably not less than 5 mol %, particularly preferably not less than 10 mol % of the whole dihydric phenol component constituting the polycarbonate.

Particularly when high stiffness and excellent resistance to hydrolysis are required, the component A-2 constituting the resin composition is particularly preferably one of the following copolycarbonates (1) to (3).

(1) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of BCF based on 100 mol % of the dihydric phenol component constituting the polycarbonate.

(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol % of the dihydric phenol component constituting the polycarbonate.

(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of Bis-TMC based on 100 mol % of the dihydric phenol component constituting the polycarbonate.

These special polycarbonates may be used alone or in combination of two or more. They may be mixed with a commonly used bisphenol A type polycarbonate.

The production processes and characteristic properties of these special polycarbonates are detailed in, for example, JP-A 6-172508, JP-A 8-27370, JP-A 2001-55435 and JP-A 2002-117580.

Out of the above polycarbonates, polycarbonates whose water absorption coefficient and Tg (glass transition temperature) have been adjusted to the following ranges by controlling their compositions are excellent in the hydrolysis resistance of the polymer itself and rarely warp after molding. Therefore, they are particularly preferred in fields in which form stability is required. (i) A polycarbonate having a water absorption coefficient of 0.05 to 0.15%, preferably 0.06 to 0.13% and a Tg of 120 to 180° C., or (ii) a polycarbonate having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of a polycarbonate is a value obtained by measuring the moisture content of a disk-like test piece having a diameter of 45 mm and a thickness of 3.0 mm after the test piece is immersed in 23° C. water for 24 hours in accordance with ISO62-1980. Tg (glass transition temperature) is a value obtained by measurement with a differential scanning calorimeter (DSC) in accordance with JIS K7121.

The carbonate precursor is a carbonyl halide, diester carbonate or haloformate, as exemplified by phosgene, diphenyl carbonate and dihaloformates of a dihydric phenol.

For the manufacture of the aromatic polycarbonate resin by the interfacial polymerization of a dihydric phenol and a carbonate precursor, a catalyst, an end sealing agent and an antioxidant for preventing the oxidation of the dihydric phenol may be optionally used.

The aromatic polycarbonate resin (component A-2) includes a branched polycarbonate resin obtained by copolymerizing a polyfunctional aromatic compound having 3 or more aromatic groups, a polyester carbonate resin obtained by copolymerizing an aromatic or aliphatic (including alicyclic) bifunctional carboxylic acid, a copolycarbonate resin obtained by copolymerizing a bifunctional alcohol (including an alicyclic bifunctional alcohol), and a polyester carbonate resin obtained by copolymerizing the bifunctional carboxylic acid and the bifunctional alcohol. It may also be a mixture of two or more of the obtained aromatic polycarbonate resins.

The branched polycarbonate resin can provide dripping preventing performance to the resin composition of the present invention. Examples of the polyfunctional aromatic compound having 3 or more aromatic groups used in the branched polycarbonate resin include phloroglucin, phloroglucide, trisphenols such as
4,6-dimethyl-2,4,6-tris(4-hydroxydiphenyl)heptene-2,
2,4,6-trimethyl-2,4,6-tris(4-hydroxyphenyl)heptane,
1,3,5-tris(4-hydroxyphenyl)benzene,
1,1,1-tris(4-hydroxyphenyl)ethane,
1,1,1-tris(3,5-dimethyl-4-hydroxyphenyl)ethane,
2,6-bis(2-hydroxy-5-methylbenzyl)-4-methylphenol and
4-{4-[1,1-bis(4-hydroxyphenyl)ethyl]benzene}-α,α-dimethylbenzylphenol, tetra(4-hydroxyphenyl)methane,
bis(2,4-dihydroxyphenyl)ketone,
1,4-bis(4,4-dihydroxytriphenylmethyl)benzene, or trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The amount of the constituent unit derived from the polyfunctional aromatic compound in the branched polycarbonate is preferably 0.01 to 2 mol %, more preferably 0.05 to 1.2 mol %, particularly preferably 0.05 to 1.0 mol % based on 100 mol % of the total of the constituent unit derived from the dihydric phenol and the constituent unit derived from the polyfunctional aromatic compound.

In the case of the melt transesterification process, a branched structure unit may be produced as a side reaction. The amount of the branched structure unit is preferably 0.001 to 2 mol %, more preferably 0.005 to 1.2 mol %, particularly preferably 0.01 to 1.0 mol % based on 100 mol % of the total of it and the constituent unit derived from the dihydric phenol. The amount of the branched structure can be calculated by $^1$H-NMR measurement.

The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol or tricyclodecanedimethanol.

A reaction system such as interfacial polymerization, melt transesterfication, the solid-phase transesterification of a carbonate prepolymer or the ring-opening polymerization of a cyclic carbonate compound all of which are processes for producing a polycarbonate resin is well known through documents and patent publications.

The viscosity average molecular weight (Mv) of the aromatic polycarbonate resin (component A-2) is not particularly limited but preferably $1.0 \times 10^4$ to $5.0 \times 10^4$, more preferably $1.1 \times 10^4$ to $3.0 \times 10^4$, much more preferably $1.2 \times 10^4$ to $2.4 \times 10^4$.

Satisfactory mechanical properties cannot be obtained from an aromatic polycarbonate resin having a viscosity average molecular weight lower than $1.0 \times 10^4$. A resin composition obtained from an aromatic polycarbonate resin having a viscosity average molecular weight higher than $5.0 \times 10^4$ is inferior in general-applicability as it has low flowability at the time of injection molding.

The aromatic polycarbonate resin (component A-2) may be obtained by mixing an aromatic polycarbonate resin having a viscosity average molecular weight outside the above range. Particularly an aromatic polycarbonate resin having a viscosity average molecular weight higher than the above range ($5.0 \times 10^4$) improves the entropy elasticity of a resin. As a result, it exhibits high moldability in gas assist molding which is used to mold a structural member and foam molding. It improves moldability better than the above branched polycarbonate.

As a more preferred example, an aromatic polycarbonate resin (component A-2-1) (may be referred to as "high-molecular weight component-containing aromatic polycarbonate resin" hereinafter) which consists of an aromatic polycarbonate resin having a viscosity average molecular weight of $7 \times 10^4$ to $3 \times 10^5$ (component A-2-1-1) and an aromatic polycarbonate resin having a viscosity average molecular weight of $1 \times 10^4$ to $3 \times 10^4$ (component A-2-1-2) and has a viscosity average molecular weight of $1.6 \times 10^4$ to $3.5 \times 10^4$ may also be used as the component A-2.

In the above high-molecular weight component-containing aromatic polycarbonate resin (component A-2-1), the molecular weight of the component A-2-1-1 is preferably $7 \times 10^4$ to $2 \times 10^5$, more preferably $8 \times 10^4$ to $2 \times 10^5$, much more preferably $1 \times 10^5$ to $2 \times 10^5$, particularly preferably $1 \times 10^5$ to $1.6 \times 10^5$. The molecular weight of the component A-2-1-2 is preferably $1 \times 10^4$ to $2.5 \times 10^4$, more preferably $1.1 \times 10^4$ to $2.4 \times 10^4$, much more preferably $1.2 \times 10^4$ to $2.4 \times 10^4$, particularly preferably $1.2 \times 10^4$ to $2.3 \times 10^4$.

The high-molecular weight component-containing aromatic polycarbonate resin (component A-2-1) can be obtained by mixing together the above components A-2-1-1 and A-2-1-2 in various ratios and adjusting the ratio to satisfy the predetermined molecular weight range. The content of the component A-2-1-1 is preferably 2 to 40 wt %, more preferably 3 to 30 wt %, much more preferably 4 to 20 wt %, particularly preferably 5 to 20 wt % based on 100 wt % of the component A-2-1.

To prepare the component A-2-1, (1) a method in which the component A-2-1-1 and the component A-2-1-2 are polymerized independently and mixed together, (2) a method in which an aromatic polycarbonate resin is produced by employing a method of producing an aromatic polycarbonate resin showing a plurality of polymer peaks in a molecular weight distribution chart by a GPC process as typified by the method disclosed by JP-A 5-306336 in the same system to ensure that the aromatic polycarbonate resin satisfies the conditions of the component A-2-1 of the present invention, or (3) a method in which the aromatic polycarbonate resin obtained by the above production method (2) is mixed with the component A-2-1-1 and/or the component A-2-1-2 produced separately may be employed.

The viscosity average molecular weight (Mv) in the present invention is calculated based on the following equation from the specific viscosity ($\eta_{sp}$) of a solution prepared by dissolving 0.7 g of the polycarbonate resin in 100 ml of methylene chloride at 20° C. which is obtained with an Ostwald viscometer based on the following equation.

Specific viscosity($\eta_{sp}$)=$(t-t_0)/t_0$

[$t_0$ is a time (seconds) required for the dropping of methylene chloride and t is a time (seconds) required for the dropping of a sample solution]

$\eta_{sp}/c=[\eta]+0.45\times[\eta]^2 c([\eta]$ represents an intrinsic viscosity)

$[\eta]=1.23\times10^{-4} Mv^{0.83}$ $c=0.7$

The viscosity average molecular weight of the resin component consisting of the aromatic polycarbonate resin (component A-2) and the polycarbonate-polydiorganosiloxane copolymer resin (component A-1) is calculated by the following procedure. That is, the composition is mixed with methylene chloride in a weight ratio of 1:20 to 1:30 to dissolve soluble matter contained in the composition. The soluble matter is collected by cerite filtration. Thereafter, the solvent contained in the obtained solution is removed. After the removal of the solvent, solid matter is dried completely so as to obtain a methylene chloride-soluble solid. The specific viscosity at 20° C. is obtained from a solution prepared by dissolving 0.7 g of the solid in 100 ml of methylene chloride as described above so as to calculate the viscosity average molecular weight My from the specific viscosity as described above.

(Component B: Glass Fibers Having a Flat Cross Section)

The resin composition of the present invention comprises glass fibers having a flat cross section (component B). The average value of the long diameter of the fiber cross section of the glass fibers having a flat cross section (component B) is 10 to 50 μm, preferably 15 to 40 μm, more preferably 20 to 35 μm. The average value of the ratio of the long diameter to the short diameter (long diameter/short diameter) of the glass fibers having a flat cross section (component B) is 1.5 to 8, preferably 2 to 6, more preferably 2.5 to 5. When glass fibers having a flat cross section which have an average value of the long diameter/short diameter ratio within this range are used, anisotropy and weld strength are greatly improved and flame retardancy can also be greatly improved as compared with a case where fibers having a noncircular cross section with an average long diameter/short diameter ratio of less than 1.5 are used. It is considered that flame retardancy is improved because the oxygen cutting effect of a resin carbide film and the oxygen cutting effect of the glass fibers having a flat cross section at the time of combustion are exerted more effectively than that of glass fibers having a circular cross section as the long side surface of each of the glass fibers having a flat cross section (component B) orients in parallel to the surface of a molded article on the surface of the molded article.

The flat cross sectional shape includes elliptic, cocoon-like and trifoil-like shapes and noncircular cross sectional shapes similar to these. Out of these, a flat shape is preferred from the viewpoint of the improvement of mechanical strength and low anisotropy.

The ratio of the average fiber length to the average fiber diameter (aspect ratio) of the glass fibers having a flat cross section (component B) is preferably 2 to 120, more preferably 2.5 to 70, much more preferably 3 to 50. When the ratio of the fiber length to the average fiber diameter is lower than 2, the effect of improving mechanical strength becomes small and when the ratio is higher than 120, anisotropy becomes large and the appearance of a molded article becomes worse.

The average fiber diameter of the glass fibers having a flat cross section (component B) refers to a number average fiber diameter obtained by transforming the flat cross sectional shape into a complete round shape of the same area. The average fiber length refers to a number average fiber length in the resin composition used in the present invention. The number average fiber length is a value calculated by an image analyzing device from an image of a filler residue observed through an optical microscope and sampled by a treatment such as the high-temperature ashing, dissolution in a solvent or decomposition with a chemical of a molded article. For the calculation of this value, fibers whose diameters are smaller than a predetermined value are not counted.

As for the glass composition of the glass fibers having a flat cross section (component B), various types of glass typified by A-glass, C-glass and E-glass may be used and not particularly limited. This glass filler may contain a component such as $TiO_2$, $SO_3$ or $P_2O_5$ as required. Out of these, E-glass (non-alkali glass) is more preferred.

The glass fibers having a flat cross section (component B) are preferably subjected to a surface treatment with a known surface treating agent such as a silane coupling agent, titanate coupling agent or aluminate coupling agent from the viewpoint of the improvement of mechanical strength. They are also preferably converged with an olefin resin, styrene resin, acrylic resin, polyester resin, epoxy resin or urethane resin, out of which epoxy resin is particularly preferred from the viewpoint of weld strength.

As the epoxy resin used for convergence, there are various epoxy resins. Examples thereof include epoxy resins such as bisphenol.epichlorohydrin type epoxy resins, glycidyl ether type epoxy resins, tetraepoxy resin, novolak type epoxy resins, glycidylamine, epoxy alkyl esters and epoxylated unsaturated compounds. When the sizing agent is other than an epoxy resin, weld strength may be inferior as compared with a case where an epoxy resin is used. The deposition amount of the sizing agent on the glass fibers having a flat cross section is preferably 0.1 to 3 wt %, more preferably 0.2 to 1 wt % based on 100 wt % of the glass fibers having a flat cross section. When the deposition amount of the sizing agent is smaller than 0.1 wt %, the sizing agent is hardly existent uniformly on the glass fibers having a flat cross section (component B), whereby its function is not fully developed. When the deposition amount is larger than 3 wt %, an effect greater than the above effect cannot be expected.

The content of the glass fibers having a flat cross section (component B) is 10 to 300 parts by weight, preferably 20 to 200 parts by weight, more preferably 30 to 150 parts by weight based on 100 parts by weight of the component A. When the content of the component B is lower than 10 parts by weight, stiffness and strength are not fully developed and when the content is higher than 300 parts by weight, flame retardancy and weld strength are lost and strand breakage or surging occurs at the time of kneading and extrusion, thereby reducing productivity.

(Component C: Adhesion Improving Agent)

The resin composition of the present invention comprises an adhesion improving agent (component C). The adhesion improving agent (component C) is a compound which improves adhesion between the resin component (component A) and the glass fibers having a flat cross section (component B).

The resin composition of the present invention must comprise the adhesion improving agent (component C) in order to markedly develop a weld strength improving effect which is the effect of the present invention. When the resin composition comprises the adhesion improving agent (component C), adhesion between the resin component (component A) and the glass fibers having a flat cross section (component B) can be made strong, thereby developing a weld strength improving effect markedly. The adhesion improving agent (component C) is preferably an organic compound having at least one functional group selected from the group consisting of an epoxy group and a carboxylate group in one molecule.

The epoxy group-containing compound is not particularly limited if it is an organic compound containing an epoxy group. Examples of the epoxy group-containing compound include phenoxy resin and epoxy resin.

The phenoxy resin is, for example, a phenoxy resin represented by the following formula (4).

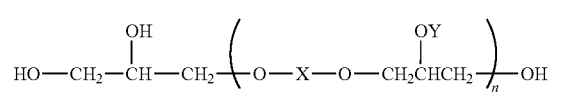

(In the above formula, X is at least one group selected from the group consisting of groups represented by the following formulas (5), Y is a hydrogen atom or the residue of a compound which reacts with a hydroxyl group, and n is an integer of 0 or more.)

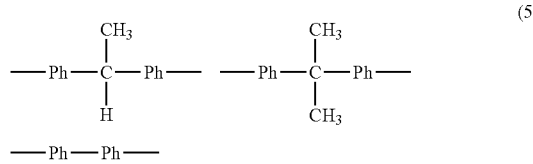

(In the above formulas, Ph denotes a phenyl group.)

In the above formula (4), examples of the compound which reacts with a hydroxyl group include esters, carbonates, compounds having an epoxy group, carboxylic anhydrides, acid halides and compounds having an isocyanate group, and the esters are preferably intramolecular esters such as caprolactone. In the phenoxy resin represented by the above formula (4), the compound in which Y is a hydrogen atom can be easily produced from a dihydric phenol and epichlorohydrin. The compound in which Y is the residue of a compound which reacts with a hydroxyl group can be easily produced by mixing a phenoxy resin produced from a dihydric phenol and epichlorohydrin with the above compound which reacts with a hydroxyl group under heating.

The epoxy resin is, for example, an epoxy resin represented by the following formula (6).

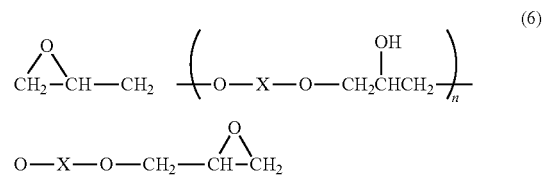

(In the above formula, X and n are as defined in the formula (4).)

The epoxy resin represented by the above formula (6) can be easily produced from a dihydric phenol and epichlorohydrin. Examples of the dihydric phenol include bisphenol A type epoxy resins such as 2,2-bis(4-hydroxyphenyl) propane[bisphenol A], 1,1-bis(4-hydroxyphenyl) ethane and 4,4'-dihydroxybiphenyl.

A polymer of a glycidyl group-containing vinyl-based unit is used as the organic compound containing an epoxy group. Examples of the glycidyl group-containing vinyl-based unit include glycidyl methacrylate, glycidyl itaconate, diglycidyl itaconate, allyl glycidyl ether, styrene-4-glycidyl ether and 4-glycidyl styrene. Glycidyl methacrylate is most preferably used as it has impact strength and the great effect of improving weld strength and elongation.

Commercially available products of the phenoxy resin and the epoxy resin may also be used. Commercially available products of the phenoxy resin (bisphenol A type) include PKHB (of InChem Corporation, Mw=13,700), PKHH (of InChem Corporation, Mw=29,000), PKFE (of InChem Corporation, Mw=36,800) and YP-50 (of Tohto Kasei Co., Ltd., Mw=43,500). Commercially available products of the epoxy resin (bisphenol A type) include EPICLON HM-101 (of Dainippon Ink and Chemicals, Inc., Mw=48,000) and jER1256 (of Mitsubishi Chemical Co., Ltd., Mw=50,000)

The weight average molecular weights of the phenoxy resin and the epoxy resin are not particularly limited but generally 5,000 to 100,000, preferably 8,000 to 80,000, more preferably 10,000 to 50,000. When the weight average molecular weight is 5,000 to 100,000, mechanical properties in particular become excellent.

The epoxy equivalents of the phenoxy resin and the epoxy resin are not particularly limited but generally 100 to 12,000, preferably 150 to 10,000, more preferably 200 to 8,000. When the epoxy equivalent is 100 to 12,000, mechanical properties in particular become excellent.

The carboxylate group-containing compound is not particularly limited if it is an organic compound containing a carboxylate group but preferably an aromatic polyester resin such as polybutylene terephthalate resin, polyethylene terephthalate resin or polyarylate resin from the viewpoints of resistance to a flame retardant, heat resistance and compatibility with the component A. Out of these, polybutylene terephthalate is most preferably used as it is excellent in impact resistance and flowability.

As the polybutylene terephthalate resin and the polyethylene terephthalate resin, an aromatic polyester resin containing an aromatic dicarboxylic acid in an amount of preferably not less than 70 mol %, more preferably not less than 90 mol %, most preferably not less than 99 mol % based on 100 mol % of a dicarboxylic acid component out of the dicarboxylic acid component and the diol component forming the polyester is used. Examples of this dicarboxylic acid include terephthalic acid, isophthalic acid, adipic acid, 2-chloroterephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalenedicarboxylic acid, 2,7-naphthalenedicarboxylic acid, bisbenzoic acid, bis(p-carboxyphenyl)methane, anthracenedicarboxylic acid, 4,4-diphenyl ether dicarboxylic acid, 4,4-diphenoxyethane dicarboxylic acid, 5-Na sulfoisophthalic acid and ethylene-bis-p-benzoic acid. These dicarboxylic acids may be used alone or in combination of two or more. The aromatic polyester resin of the present invention may contain less than 30 mol % of an aliphatic dicarboxylic acid component besides the above aromatic dicarboxylic acid. Examples of the aliphatic dicarboxylic acid component include adipic acid, sebacic acid, azelaic acid, dodecanedioic acid, 1,3-cyclohexanedicarboxylic acid and 1,4-cyclohexanedicarboxylic acid. Examples of the diol component include ethylene glycol, diethylene glycol, 1,2-propylene glycol, 1,3-propanediol, 2,2-dimethyl-1,3-propanediol, trans- or cis-2,2,4,4-tetramethyl-1,3-cyclobutanediol, 1,4-butanediol, neopentyl glycol, 1,5-pentanediol, 1,6-hexanediol, 1,4-cyclohexanedimethanol, 1,3-cyclohexanedimethanol, decamethylene glycol, cyclohexanediol, p-xylenediol, bisphenol A, tetrabromobisphenol A and tetrabromobisphenol A-bis(2-hydroxyethyl ether). They may be used alone or in combination of two or more. The content of the dihydric phenol in the diol component is preferably not more than 30 mol %.

As for the processes for producing the aromatic polybutylene terephthalate resin and the aromatic polyethylene terephthalate resin, the above dicarboxylic acid component and the above diol component are polymerized under heating in the presence of a polycondensation catalyst containing titanium, germanium or antimony in accordance with a commonly used method, and by-produced water or lower alcohol is discharged to the outside of the system. Examples of the germanium-based polymerization catalyst include oxide, hydroxide, halides, alcoholates and phenolates of germanium, and more specific examples include germanium oxide, germanium hydroxide, germanium tetrachloride and tetramethoxy germanium. In the present invention, the above polycondensation catalyst may be used in combination with a manganese, zinc, calcium or magnesium compound which may be used in a transesterification reaction as the pre-stage of conventionally known polycondensation, and polycondensation may be carried out by deactivating the catalyst with a compound such as phosphoric acid or phosphorous acid after the end of the transesterification reaction. Further, the aromatic polybutylene terephthalate resin and the aromatic polyethylene terephthalate resin may be produced in a batch or continuous polymerization manner.

Although the molecular weights of the aromatic polybutylene terephthalate resin and the aromatic polyethylene terephthalate resin are not particularly limited, the intrinsic viscosities measured at 25° C. in an o-chlorophenol solvent thereof are preferably 0.4 to 1.5, particularly preferably 0.5 to 1.2.

The terminal carboxyl group amounts of the aromatic polybutylene terephthalate resin and the aromatic polyethylene terephthalate resin are preferably 5 to 75 eq/ton, more preferably 5 to 70 eq/ton, much more preferably 7 to 65 eq/ton.

The aromatic polyarylate resin is obtained from an aromatic dicarboxylic acid or a derivative thereof and a dihydric phenol or a derivative thereof. Any aromatic dicarboxylic acids used to prepare a polyarylate may be used as long as they react with a dihydric phenol to provide a satisfactory polymer and may be used alone or in combination of two or more.

Preferred examples of the aromatic dicarboxylic acid component include terephthalic acid and isophthalic acid. A mixture of these may also be used.

Examples of the dihydric phenol component include
2,2-bis(4-hydroxyphenyl) propane,
2,2-bis(4-hydroxy-3,5-dibromophenyl) propane,
2,2-bis(4-hydroxy-3,5-dichlorophenyl) propane,
4,4-dihydroxydiphenyl sulfone, 4,4-dihydroxydiphenyl ether,
4,4-dihydroxydiphenyl sulfide, 4,4-dihydroxydiphenyl ketone, 4,4-dihydroxydiphenylmethane,
2,2'-bis(4-hydroxy-3,5-dimethylphenyl) propane,
1,1-bis(4-hydroxyphenyl) ethane,
1,1-bis(4-hydroxyphenyl)cyclohexane,
4,4'-dihydroxydiphenyl and hydroquinone. Although these dihydric phenol components are para-substitution products, another isomer may be used, and further ethylene glycol, propylene glycol or neopentyl glycol may be used in combination with the dihydric phenol component.

Out of these, a polyarylate resin which contains terephthalic acid and isophthalic acid as the aromatic dicarboxylic acid components and 2,2-bis(4-hydroxyphenyl) propane (bisphenol A) as the dihydric phenol component is preferred. The ratio of terephthalic acid to isophthalic acid is preferably 9/1 to 1/9 (molar ratio), desirably 7/3 to 3/7 from the viewpoints of melt processability and performance balance.

Another typical polyarylate resin contains terephthalic acid as the aromatic dicarboxylic acid component and bisphenol A and hydroquinone as the dihydric phenol components. The ratio of bisphenol A to hydroquinone is preferably 50/50 to 70/30 (molar ratio), more preferably 55/45 to 70/30, much more preferably 60/40 to 70/30.

The viscosity average molecular weight of the polyarylate resin is preferably about 7,000 to 100,000 from the viewpoints of physical properties and extrusion processability. Either one of interfacial polycondensation and transesterification may be selected as the polymerization process for the polyarylate resin.

The adhesion improving agent (component C) is preferably at least one resin selected from the group consisting of phenoxy resin, epoxy resin, glycidyl methacrylate resin, polybutylene terephthalate resin, polyethylene terephthalate resin and polyarylate resin.

The content of the adhesion improving agent (component C) is 5 to 25 parts by weight, preferably 5 to 20 parts by weight, more preferably 5 to 15 parts by weight based on 100 parts by weight of the component A. When the content of the component C is lower than 5 parts by weight, a resin composition having excellent weld strength is not obtained. When the content is higher than 25 parts by weight, flame retardancy is impaired.

(Component D: Phosphorus-based Flame Retardant)

The resin composition of the present invention comprises a phosphorus-based flame retardant (component D). The phosphorus-based flame retardant (component D) is not particularly limited if it contains a phosphorus atom in the molecule.

The phosphorus-based flame retardant (component D) is preferably at least one phosphorus-based flame retardant selected from the group consisting of a phosphoric acid ester, a condensation phosphoric acid ester and a phosphazene compound. Red phosphorus is an example of the phosphorus-based flame retardant (component D). When a phosphorus-based flame retardant (component D) and an aromatic polycarbonate-polydiorganosiloxane copolymer resin (component A-1) are coexistent, flame retardancy can be improved synergistically.

The phosphoric acid ester is an ester compound of phosphoric acid and an alcohol compound or phenol compound. In the present invention, flame retardancy can be provided to the resin composition by mixing a phosphoric acid ester.

Examples of the phosphoric acid ester include trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyldiphenyl phosphate, xylenyldiphenyl phosphate, diphenyl(2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenyl phosphine oxide, tricresyl phosphine oxide, diphenyl methane phosphonate, diethyl phenylphosphonate, resorcinol polyphenyl phosphate, resorcinol poly(di-2,6-xylyl)phosphate, bisphenol A polycresyl phosphate, hydroquinone poly(2,6-xylyl)phosphate and condensation phosphoric acid esters such as condensates thereof.

The condensation phosphoric acid esters include resorcinol bis(di-2,6-xylyl)phosphate, resorcinol bis(diphenyl phosphate) and bisphenol A bis(diphenyl phosphate). Commercially available products of resorcinol bis(di-2,6-xylyl) phosphate include PX-200 (of Daihachi Chemical Industry, Co., Ltd.). Commercially available products of resorcinol bis(diphenyl phosphate) include CR-733S (of Daihachi Chemical Industry, Co., Ltd.). Commercially available products of bisphenol A bis(diphenyl phosphate) include CR-741 (of Daihachi Chemical Industry, Co., Ltd.). Out of these, resorcinol bis(di-2,6-xylyl)phosphate is preferably used as it has excellent heat resistance.

The phosphazene compound can provide flame retardancy to the resin composition as it contains a phosphorus atom and a nitrogen atom in the molecule. Any phosphazene compound is acceptable if it is a compound containing no halogen atom and having a phosphazene structure in the molecule. The term "phosphazene structure" as used herein means a structure represented by the formula —P(R2)=N— [R2 is an organic group]. The phosphazene compound is represented by the formula (7) or (8).

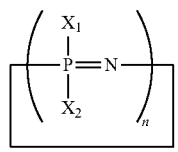

(7)

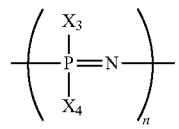

(8)

(In the above formulas, $X_1$, $X_2$, $X_3$ and $X_4$ are each a hydrogen atom, hydroxyl group, amino group or organic group containing no halogen atom. n is an integer of 3 to 10.)

In the above formulas (7) and (8), examples of the organic group containing no halogen atom represented by $X_1$, $X_2$, $X_3$ and $X_4$ include alkoxy group, phenyl group, amino group and allyl group.

Commercially available products of the phosphazene compound include SPR-100, SA-100, SPB-100 and SPB-100L (of Otsuka Chemical Co., Ltd.) and FP-100 and FP-110 (of Fushimi Pharmaceutical Co., Ltd.).

As red phosphorus, not only untreated red phosphorus but also red phosphorus which is coated with a metal hydrate or a resin to improve stability may be used. Examples of the metal hydrate include aluminum hydroxide, magnesium hydroxide, zinc hydroxide and titanium hydroxide. Although the type and coating amount of the resin are not particularly limited, the resin is preferably phenol resin or epoxy resin having high affinity for the polycarbonate resin used in the present invention.

The coating amount is preferably not less than 1 mass % based on red phosphorus. When the coating amount is less than 1 mass %, the coating effect is not satisfactory and a phosphine gas may be generated at the time of high-temperature kneading. The coating amount is desirably as large as possible in terms of safety but preferably not more than 20 mass % from the viewpoint of flame retardancy.

The content of the phosphorus-based flame retardant (component D) is 5 to 45 parts by weight, preferably 10 to 40 parts by weight, more preferably 15 to 35 parts by weight based on 100 parts by weight of the component A. When the content of the component D is lower than 5 parts by weight, excellent flame retardancy is not obtained. When the content is higher than 45 parts by weight, weld strength and heat resistance significantly degrade.

(Component E: Fluorine-containing Dripping Inhibitor)

The resin composition of the present invention comprises a fluorine-containing dripping inhibitor (component E). When the fluorine-containing dripping inhibitor is used in combination with the above flame retardant, higher flame retardancy can be obtained. The fluorine-containing dripping inhibitor (component E) is, for example, a fluorine-containing polymer having fibril forming ability. Examples of the polymer include polytetrafluoroethylene, tetrafluoroethylene-based copolymers (such as tetrafluoroethylene/hexafluoropropylene copolymer), partially fluorinated polymers described in U.S. Pat. No. 4,379,910 and polycarbonate resins produced from fluorinated diphenols. It is preferably polytetrafluoroethylene (may be referred to as "PTFE" hereinafter).

The polytetrafluoroethylene having fibril forming ability (fibrillated PTFE) has an extremely high molecular weight and tends to become fibrous through bonding of PTFE's by an external function such as shearing force. The number average molecular weight of fibrillated PTFE is 1,500,000 to several tens of million. The lower limit is preferably 3,000,000. The number average molecular weight is calculated based on the melt viscosity of polytetrafluoroethylene at 380° C. as disclosed in JP-A 6-145520. That is, fibrillated PTFE has a melt viscosity at 380° C. measured by the method described in the above publication of $10^7$ to $10^{13}$ poise, preferably $10^8$ to $10^{12}$ poise.

PTFE in the form of an aqueous dispersion besides a solid may also be used. PTFE having fibril forming ability may be used as a mixture with another resin in order to improve dispersibility in a resin and obtain high flame retardancy and mechanical properties. As disclosed in JP-A 6-145520, PTFE having a core made of fibrillated PTFE and a shell made of polytetrafluoroethylene having a low molecular weight is preferably used as well.

Commercially available products of the fibrillated PTFE include the Teflon (registered trademark) 6J of Du Pont-Mitsui Fluorochemicals Co., Ltd. and the Polyflon MPA FA500 and F-201L of Daikin Industries, Ltd. Commercially available products of the aqueous dispersion of the fibrillated PTFE include the Fluon AD-1 and AD-936 of Asahi ICI Fluoropolymers Co., Ltd., the Fluon D-1 and D-2 of Daikin Industries, Ltd. and the Teflon (registered trademark) 30J of Du Pont-Mitsui Fluorochemicals Co., Ltd.

The fibrillated PTFE in a mixture form obtained by (1) a method in which an aqueous dispersion of fibrillated PTFE and an aqueous dispersion or solution of an organic polymer are mixed together to carry out co-precipitation so as to obtain a coaggregation mixture (method disclosed by JP-A 60-258263 and JP-A 63-154744), (2) a method in which an aqueous dispersion of fibrillated PTFE and dried organic polymer particles are mixed together (method disclosed by JP-A 4-272957), (3) a method in which an aqueous dispersion of fibrillated PTFE and an organic polymer particle solution are uniformly mixed together and their media are removed from the mixture at the same time (method disclosed by JP-A 06-220210 and JP-A 08-188653), (4) a method in which a monomer forming an organic polymer is polymerized in an aqueous dispersion of fibrillated PTFE (method disclosed by JP-A 9-95583), or (5) a method in which an aqueous dispersion of PTFE and a dispersion of an organic polymer are uniformly mixed together and a vinyl-based monomer is polymerized in the mixed dispersion to obtain a mixture (method disclosed by JP-A 11-29679) may be used.

Commercially available products of the fibrillated PTFE in these mixture forms include the METABLEN A3800 (trade name) of Mitsubishi Rayon Co., Ltd., the BLENDEX B449 (trade name) of GE Specialty Chemicals Corporation and the POLY TS AD001 (trade name) of Pacific Interchem Corporation.

To make effective use of the high mechanical strength of the resin composition of the present invention, the above fibrillated PTFE is preferably dispersed as finely as possible. As means for attaining the fine dispersion, the above fibrillated PTFE in the mixture form is advantageous. A method in which an aqueous dispersion of fibrillated PTFE is directly supplied into a melt kneader is also advantageous for the fine dispersion. However, special attention must be paid to the slight deterioration of the color of an aqueous dispersion of fibrillated PTFE. As for the ratio of fibrillated PTFE in the mixture form, the content of the fibrillated PTFE is preferably 10 to 80 wt %, more preferably 15 to 75 wt % based on 100 wt % of the mixture. When the content of the fibrillated PTFE falls within the above range, the high dispersibility of the fibrillated PTFE can be obtained.

The content of the fluorine-containing dripping inhibitor (component E) is 0.01 to 3 parts by weight, preferably 0.05 to 2.5 parts by weight, more preferably 0.1 to 2 parts by weight based on 100 parts by weight of the component A. When the content of the component E is lower than 0.01 part by weight, an effective dripping preventing effect is not obtained. When the content is higher than 3 parts by weight, impact resistance and the appearance of a molded article deteriorate.

(Component F: Silicate Compound)

The resin composition of the present invention preferably comprises a silicate compound (component F). The silicate compound (component F) is a compound containing at least a metal oxide component and a $SiO_2$ component, preferably orthosilicate, disilicate, cyclic silicate or chain silicate. The silicate compound as the component F takes a crystalline state, and its crystal form may be fibrous or plate-like.

The silicate compound (component F) may be any one of composite oxide, oxyacid salt (made of an ion lattice) and solid solution. Further, the composite oxide may be a combination of two or more single oxides or a combination of two or more of single oxides and oxyacid salts, and the solid solution may be a solid solution of two or more metal oxides, or a solid solution of two or more oxyacid salts.

The silicate compound (component F) may be a hydrate. The form of crystal water in the hydrate is a hydrogen silicate ion as Si—OH, hydroxy ion (OH) to a metal cation, or a $H_2O$ molecule in a gap in the structure.

As the silicate compound (component F), an artificially synthesized product corresponding to a natural product may also be used. As the artificially synthesized product, silicate compounds obtained by conventionally known methods, for example, synthesizing methods making use of a solid reaction, hydrothermal reaction and super high-pressure reaction may be used.

Examples of the silicate compound in each metal oxide component (MO) are given below. The names within the parentheses are the names of compounds containing a silicate compound as the main component, and the compounds within the parentheses may be used as given metal salts.

Silicate compounds containing $K_2O$ include $K_2O.SiO_2$, $K_2O.4SiO_2.H_2O$, $K_2O.Al_2O_3.2SiO_2$ (kalsilite), $K_2O.Al_2O_3.4SiO_2$ (leucite) and $K_2O.Al_2O_3.6SiO_2$ (orthoclase).

Silicate compounds containing $Na_2O$ include $Na_2O.SiO_2$ and hydrate thereof, $Na_2O.2SiO_2$, $2Na_2O.SiO_2$, $Na_2O.4SiO_2$, $Na_2O.3SiO_2.3H_2O$, $Na_2O.Al_2O_3.2SiO_2$, $Na_2O.Al_2O_3.4SiO_2$ (jadeite), $2Na_2O.3CaO.5SiO_2$, $3Na_2O.2CaO.5SiO_2$ and $Na_2O.Al_2O_3.6SiO_2$ (albite).

Silicate compounds containing $Li_2O$ include $Li_2O.SiO_2$, $2Li_2O.SiO_2$, $Li_2O.SiO_2.H_2O$, $3Li_2O.2SiO_2$, $Li_2O.Al_2O_3.4SiO_2$ (petalite), $Li_2O.Al_2O_3.2SiO_2$ (eucryptite) and $Li_2O.Al_2O_3.4SiO_4$ (spodumene).

Silicate compounds containing BaO include $BaO.SiO_2$, $2BaO.SiO_2$, $BaO.Al_2O_3.2SiO_2$ (celsian) and $BaO.TiO_2.3SiO_2$ (benitoite).

Silicate compounds containing CaO include $3CaO.SiO_2$ (ehrlite of a cement clinker compound), $2CaO.SiO_2$ (belite of a cement clinker compound), $2CaO.MgO.2SiO_2$ (akermanite), $2CaO.Al_2O_3.SiO_2$ (gehlenite), solid solution of akermanite and gehlenite (melilite), $CaO.SiO_2$ (wollastonite (including both α-type and β-type)), $CaO.MgO.2SiO_2$ (diopside), $CaO.MgO.SiO_2$ (monticellite), $3CaO.MgO.2SiO_2$ (merwinite), $CaO.Al_2O_3.2SiO$ (anorthite), tobermorite group hydrates such as $5CaO.6SiO_2.5H_2O$ (tobermorite, $5CaO.6SiO_2.9H_2O$ is also included), wollastonite group hydrates such as $2CaO.SiO_2.H_2O$ (hillebrandite), xonotlite group hydrates such as $6CaO.6SiO_2.H_2O$ (xonotlite), gyrolite group hydrates such as $2CaO.SiO_2.2H_2O$ (gyrolite), $CaO.Al_2O_3.2SiO_2.H_2O$ (lawsonite), $CaO.FeO.2SiO_2$ (hedenbergite), $3CaO.2SiO_2$ (kilchoanite), $3CaO.Al_2O_3.3SiO_2$ (grossular), $3CaO.Fe_2O_3.3SiO_2$ (andradite), 6CaO.4Al$_2$O$_3$.FeO.SiO$_2$ (pleochroaite), clinozoisite, piedmontite, allanite, vesuvianite, axinite, scawtite and augite.

Further, Portland cement is given as a silicate compound containing CaO. The type of Portland cement is not particularly limited, and any one of ordinary, early-strength, ultra-high-early-strength, moderate-heat, sulfate-resistant and white Portland cements may be used. Mixed cements such as blast-furnace cement, silica cement and fly ash cement may also be used as the component F.

Other silicate compounds containing CaO include blast furnace slag and ferrite.

Silicate compounds containing ZnO include ZnO.SiO$_2$, 2ZnO.SiO$_2$ (troostite) and 4ZnO.2SiO$_2$.H$_2$O (hemimorphite).

Silicate compounds containing MnO include MnO.SiO$_2$, 2MnO.SiO$_2$, CaO.4MnO.5SiO$_2$ (rhodonite) and kozulite.

Silicate compounds containing FeO include FeO.SiO$_2$ (ferrosilite), 2FeO.SiO$_2$ (fayalite), 3FeO.Al$_2$O$_3$.3SiO$_2$ (almandine) and 2CaO.5FeO.8SiO$_2$.H$_2$O (ferroactinolite).

Silicate compounds containing CoO include CoO.SiO$_2$ and 2CoO.SiO$_2$.

Silicate compounds containing MgO include MgO.SiO$_2$ (steatite, enstatite), 2MgO.SiO$_2$ (forsterite), 3MgO.Al$_2$O$_3$.3SiO$_2$ (pyrope), 2MgO.2Al$_2$O$_3$.5SiO$_2$ (cordierite), 2MgO.3SiO$_2$. 5H$_2$O, 3MgO.4SiO$_2$.H$_2$O (talc), 5MgO.8SiO$_2$. 9H$_2$O (attaparugite), 4MgO.6SiO$_2$.7H$_2$O (sepiolite), 3MgO.2SiO$_2$.2H$_2$O (chrysolite), 5MgO.2CaO.8SiO$_2$.H$_2$O (tremolite), 5MgO.Al$_2$O$_3$. 3SiO$_2$.4H$_2$O (chlorite), K$_2$O.6MgO.Al$_2$O$_3$.6SiO$_2$.2H$_2$O (phlogopite), Na$_2$O.3MgO.3Al$_2$O$_3$.8SiO$_2$.H$_2$O (glaucophane), magnesium tourmaline, anthophyllite, cummingtonite, vermiculite and smectite.

Silicate compounds containing Fe$_2$O$_3$ include Fe$_2$O$_3$.SiO$_2$.

Silicate compounds containing ZrO$_2$ include ZrO$_2$.SiO$_2$ (zircon) and AZS refractory.

Silicate compounds containing Al$_2$O$_3$ include Al$_2$O$_3$.SiO$_2$ (sillimanite, andalusite, kyanite), 2Al$_2$O$_3$.SiO$_2$, Al$_2$O$_3$.3SiO$_2$, 3Al$_2$O$_3$.2SiO$_2$ (mullite), Al$_2$O$_3$.2SiO$_2$.2H$_2$O (kaolinite), Al$_2$O$_3$. 4SiO$_2$.H$_2$O (pyrophyllite), Al$_2$O$_3$.4SiO$_2$.H$_2$O (bentonite), K$_2$O.3Na$_2$O.4Al$_2$O$_3$.8SiO$_2$ (nepheline), K$_2$O.3Al$_2$O$_3$.6SiO$_2$.2H$_2$O (mascovite, sericite), K$_2$O.6MgO.Al$_2$O$_3$.6SiO$_2$.2H$_2$O (phlogopite), zeolite, synthetic fluorophlogopite and biotite.

Out of the above silicate compounds, talc, mica and wollastonite are particularly preferred (Talc)

Talc is hydrous magnesium silicate in terms of chemical composition, generally represented by the chemical formula 4SiO$_2$.3MgO.2H$_2$O and a flaky particle having a lamellar structure. Talc comprises 56 to 65 wt % of SiO$_2$, 28 to 35 wt % of MgO and about 5 wt % of H$_2$O. As other trace components, it comprises 0.03 to 1.2 wt % of Fe$_2$O$_3$, 0.05 to 1.5 wt % of Al$_2$O$_3$, 0.05 to 1.2 wt % of CaO, not more than 0.2 wt % of K$_2$O and not more than 0.2 wt % of Na$_2$O. As for the particle diameter of talc, the average particle diameter measured by a sedimentation method is preferably 0.1 to 15 μm (more preferably 0.2 to 12 μm, much more preferably 0.3 to 10 μm, particularly preferably 0.5 to 5 μm). It is particularly preferred to use talc having a bulk density of not less than 0.5 (g/cm$^3$) as a raw material. The average particle diameter of talc is D50 (median diameter in particle size distribution) measured by an X-ray transmission method which is one of liquid-phase sedimentation methods. Examples of the apparatus used for this measurement include the Sedigraph5100 of Micromeritics.

The method of milling talc ore is not particularly limited, and axial-flow milling, annular milling, roll milling, ball milling, jet milling and container rotation type compression shearing milling methods may be used. Further, talc which has been classified by a classifier to become uniform in particle size distribution after milling is preferred. The classifier is not particularly limited and may be an impactor type inertia force classifier (such as variable impactor), Coanda effect-use inertia force classifier (such as elbow jet), or centrifugal classifier (such as multi-stage cyclone separator, microplex classifier, dispersion separator, accucut classifier, turbo classifier, turboplex classifier, micron separator or super separator).

Further, talc which is agglomerated is preferred from the viewpoint of handling ease, and production processes thereof include one making use of deaeration compression and one making use of compression by using a sizing agent. The process making use of deaeration compression is particularly preferred because it is simple and prevents an unrequired sizing agent resin component from being contained in the resin composition of the present invention.

(Mica)

Mica having an average particle diameter measured by a micro-track laser diffraction method of 10 to 100 μm may be preferably used. The average particle diameter is more preferably 20 to 50 μm. When mica has an average particle diameter smaller than 10 μm, its stiffness improving effect becomes unsatisfactory and when mica has an average particle diameter larger than 100 μm, its stiffness improving effect becomes unsatisfactory as well and mechanical strength such as impact resistance sharply degrades disadvantageously. Mica having a thickness actually measured by observation through an electron microscope of 0.01 to 1 μm may be preferably used. The thickness is more preferably 0.03 to 0.3 μm. The aspect ratio of mica is preferably 5 to 200, more preferably 10 to 100. Mica in use is preferably muscovite mica having a Mohs hardness of about 3. Muscovite mica has higher stiffness and higher strength than other mica such as phlogopite mica and attains the object of the present invention at a higher level. As the method of milling mica, both dry and wet milling methods may be employed. The dry milling method is inexpensive and commonly used whereas the wet milling method is effective in milling mica finely and thinly with the result that the effect of improving the stiffness of the resin composition becomes higher.

(Wollastonite)

The fiber diameter of wollastonite is preferably 0.1 to 10 more preferably 0.1 to 5 μm, much more preferably 0.1 to 3 μm. The aspect ratio (average fiber length/average fiber diameter) of wollastonite is preferably not less than 3. The upper limit of the aspect ratio is not more than 30. As for the fiber diameter, a reinforcing filler is observed through an electron microscope to obtain the diameter of each fiber so as to calculate a number average fiber diameter from the measurement values. The reason for the use of the electron microscope is that it is difficult to measure the level of size to be measured accurately with an optical microscope. Fillers to be measured for fiber diameter are chosen at random from an image obtained by observing through the electron microscope to measure each fiber diameter at a position close to the center part so as to calculate a number average fiber diameter from the obtained measurement values. The magnification for observation is about 1,000×, and the number of fibers to be measured is not less than 500 (preferably not more than 600 from the viewpoint of work efficiency). As for the measurement of the average fiber length, the fillers are observed through an optical microscope to obtain the length of each fiber so as to calculate a number average fiber length from the measurement values. For observation through the optical microscope, a sample in which fillers are dispersed so well that they do not overlap with one another is first prepared. Observation is carried out with a 20-power objective lens, and this observed image is input into a CCD camera having about 250,000 pixels as image data. The fiber length is calculated from this obtained image data by using an image analyzing apparatus and a program for obtaining the maximum distance between two points of the image data. Under the above conditions, the size of each pixel corresponds to a length of 1.25 μm, and the number of the measured fibers is not less than 500 (preferably not more than 600 from the viewpoint of work efficiency).

It is preferred that iron contained in the raw material ore and iron contained by the abrasion of the apparatus when the raw material ore is milled should be removed as much as possible by a magnetic ore separator in order to fully reflect the whiteness of wollastonite upon the resin composition. The iron content of wollastonite is preferably reduced to not more than 0.5 wt % in terms of $Fe_2O_3$ by the magnetic ore separator.

Although it is preferred that the silicate compound, preferably talc, mica or wollastonite should not be surface treated, it may be surface treated with a surface treating agent such as a silane coupling agent, higher fatty acid ester or wax.

Further, it may be granulated with a sizing agent such as a resin, higher fatty acid ester or wax to become granular.

The content of the silicate compound (component F) is preferably 0.1 to 10 parts by weight, more preferably 1 to 10 parts by weight, much more preferably 2 to 8 parts by weight based on 100 parts by weight of the component A. When the content of the component F is lower than 0.1 part by weight, satisfactory flame retardancy may not be obtained. When the content is higher than 10 parts by weight, weld strength and impact resistance may degrade.

The resin composition of the present invention may comprise a stabilizer, release agent, coloring material and flame retardant except for the component E to prevent the reduction of its molecular weight and stabilize its color during molding.

(Other Additives)

(i) Stabilizer

The resin composition of the present invention may be mixed with a known stabilizer. The stabilizer is selected from a phosphorus-based stabilizer, hindered phenol-based antioxidant, ultraviolet absorbent and optical stabilizer.

(i-1) Phosphorus-based Stabilizer

Examples of the phosphorus-based stabilizer include phosphorous acid, phosphoric acid, phosphonous acid, phosphonic acid and esters thereof, and tertiary phosphines. Out of these, phosphorous acid, phosphoric acid, phosphonous acid, phosphonic acid, triorganophosphate compounds and acid phosphate compounds are preferred. The organic groups of the acid phosphate compounds include mono-substituents, di-substituents and mixtures thereof. In the following exemplary compounds corresponding to these compounds, the organic groups include the same as above.

The triorganophosphate compounds include trimethyl phosphate, triethyl phosphate, tributyl phosphate, trioctyl phosphate, tridecyl phosphate, tridodecyl phosphate, trilauryl phosphate, tristearyl phosphate, tricresyl phosphate, triphenyl phosphate, trichlorophenyl phosphate, diphenylcresyl phosphate, diphenylmonoorthoxenyl phosphate and tributoxyethyl phosphate. Out of these, trialkyl phosphates are preferred. The number of carbon atoms of the trialkyl phosphate is preferably 1 to 22, more preferably 1 to 4. The particularly preferred trialkyl phosphate is trimethyl phosphate.

The acid phosphate compounds include methyl acid phosphate, ethyl acid phosphate, butyl acid phosphate, butoxyethyl acid phosphate, octyl acid phosphate, decyl acid phosphate, lauryl acid phosphate, stearyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphate and bisphenol A acid phosphate. Out of these, long-chain dialkyl acid phosphates having 10 or more carbon atoms are preferred because they are effective in improving heat stability and have high stability themselves.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl) phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol and have a cyclic structure may also be used. These phosphite compounds include
2,2'-methylenebis(4,6-di-tert-butylphenyl) (2,4-di-tert-butylphenyl)phosphite,
2,2'-methylenebis(4,6-di-tert-butylphenyl)(2-tert-butyl-4-methylphenyl)phosphite and
2,2'-methylenebis(4,6-di-tert-butylphenyl)octyl phosphite.

Examples of the phosphonite compound include
tetrakis(2,4-di-tert-butylphenyl)-4,4'-biphenylene diphosphonite,
tetrakis(2,4-di-tert-butylphenyl)-4,3'-biphenylene diphosphonite,
tetrakis(2,4-di-tert-butylphenyl)-3,3'-biphenylene diphosphonite,
tetrakis(2,6-di-tert-butylphenyl)-4,4'-biphenylene diphosphonite,
tetrakis(2,6-di-tert-butylphenyl)-4,3'-biphenylene diphosphonite,
tetrakis(2,6-di-tert-butylphenyl)-3,3'-biphenylene diphosphonite,
bis(2,4-di-tert-butylphenyl)-4-phenyl-phenyl phosphonite,
bis(2,4-di-tert-butylphenyl)-3-phenyl-phenyl phosphonite,
bis(2,6-di-n-butylphenyl)-3-phenyl-phenyl phosphonite,
bis(2,6-di-tert-butylphenyl)-4-phenyl-phenyl phosphonite
and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and
tetrakis(2,4-di-tert-butylphenyl)-biphenylene diphosphonites and
bis(2,4-di-tert-butylphenyl)-phenyl-phenyl phosphonites are more preferred. The phosphonite compound may be and is preferably used in combination with the above phosphite compound having an aryl group substituted by two or more alkyl groups.

Examples of the phosphonate compound include dimethylbenzene phosphonate, diethylbenzene phosphonate and dipropylbenzene phosphonate.

The tertiary phosphines include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphthyl phosphine and diphenylbenzyl phosphine. Triphenyl phosphine is particularly preferred as the tertiary phosphine.

The preferred phosphorus-based stabilizer is selected from triorganophosphate compounds, acid phosphate compounds and phosphite compounds represented by the following formula (9). Triorganophosphate compounds are particularly preferably used.

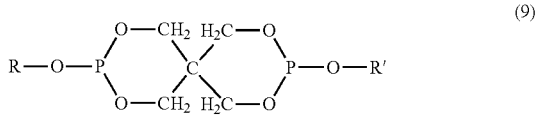

(9)

(In the formula (9), R and R' are each an alkyl group having 6 to 30 carbon atoms or aryl group having 6 to 30 carbon atoms and may be the same or different.)

As described above, tetrakis(2,4-di-tert-butylphenyl)-biphenylene diphosphonites are preferred as the phosphonite compound, and stabilizers comprising the phosphonites as the main component are available on the market under the names of Sandostab P-EPQ (trademark, manufactured by Clariant) and Irgafos P-EPQ (trademark, manufactured by CIBA SPECIALTY CHEMICALS).

Out of the phosphite compounds represented by the above formula (9), distearyl pentaerythritol diphosphite, bis(2,4-di-tert-butylphenyl)pentaerythritol diphosphite, bis(2,6-di-tert-butyl-4-methylphenyl)pentaerythritol diphosphite and bis{2,4-bis(1-methyl-1-phenylethyl)phenyl}pentaerythritol diphosphite are more preferred.

(i-2) Hindered Phenol-based Antioxidant

Various compounds which are generally mixed with a resin may be used as the hindered phenol compound. Examples of the hindered phenol compound include α-tocopherol, butylhydroxytoluene, sinapyl alcohol, vitamin E, octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl) propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl) propionyloxy]-1,1-dimethylethyl}-2,4,8,10-tetraoxaspiro [5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3,5-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris-2[3(3,5-di-tert-butyl-4-hydroxyphenyl) propionyloxy]ethyl isocyanurate, tetrakis[methylene-3-(3,5-di-tert-butyl-4-hydroxyphenyl) propionate]methane, triethylene glycol-N-bis-3-(3-tert-butyl-4-hydroxy-5-methylphenyl) propionate, triethylene glycol-N-bis-3-(3-tert-butyl-4-hydroxy-5-methylphenyl) acetate, 3,9-bis[2-{3-(3-tert-butyl-4-hydroxy-5-methylphenyl) acetyloxy}-1,1-dimethylethyl]-2,4,8,10-tetraoxaspiro [5,5]undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzyl) benzene and tris(3-tert-butyl-4-hydroxy-5-methylbenzyl) isocyanurate.

Out of the above compounds, tetrakis[methylene-3-(3-tert-butyl-4-hydroxy-5-methylphenyl)propionate]methane, octadecyl-3-(3,5-di-tert-butyl-4-hydroxyphenyl) propionate and 3,9-bis[2-{3-(3-tert-butyl-4-hydroxy-5-methylphenyl) propionyloxy}-1,1-dimethylethyl]-2,4,8,10-tetraoxaspiro[5,5]undecane are preferably used in the present invention. 3,9-bis[2-{3-(3-tert-butyl-4-hydroxy-5-methylphenyl) propionyloxy}-1,1-dimethylethyl]-2,4,8,10-tetraoxaspiro[5,5] undecane is particularly preferred. The above hindered phenol-based antioxidants may be used alone or in combination of two or more.

Preferably, anyone of the phosphorus-based stabilizer and the hindered phenol-based antioxidant is used. The phosphorus-based stabilizer is more preferably used, and the triorganophosphate compound is much more preferably used. The amounts of the phosphorus-based stabilizer and the hindered phenol-based antioxidant are each preferably 0.005 to 1 part by weight, more preferably 0.01 to 0.3 part by weight based on 100 parts by weight of the component A.

(i-3) Ultraviolet Absorbent

The resin composition of the present invention may comprise an ultraviolet absorbent. Since the resin composition of the present invention has a good color, it can retain the color for a long time even when it is used outdoors by mixing an ultraviolet absorbent.

Benzophenone-based ultraviolet absorbents as the ultraviolet absorbent include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Benzotriazole-based ultraviolet absorbents as the ultraviolet absorbent include
2-(2-hydroxy-5-methylphenyl)benzotriazole,
2-(2-hydroxy-5-tert-octylphenyl)benzotriazole,
2-(2-hydroxy-3,5-dicumylphenyl)phenylbenzotriazole,
2-(2-hydroxy-3-tert-butyl-5-methylphenyl-5-chlorobenzotriazole,
2,2'-methylenebis[4-(1,1,3,3-tetramethylbutyl)-6-(2H-benzotriazol-2-yl)phenol],
2-(2-hydroxy-3,5-di-tert-butylphenyl)benzotriazole,
2-(2-hydroxy-3,5-di-tert-butylphenyl)-5-chlorobenzotriazole, 2-(2-hydroxy-3,5-di-tert-amylphenyl)benzotriazole,
2-(2-hydroxy-5-tert-octylphenyl)benzotriazole,
2-(2-hydroxy-5-tert-butylphenyl)benzotriazole,
2-(2-hydroxy-4-octoxyphenyl)benzotriazole,
2,2'-methylenebis(4-cumyl-6-benzotriazolephenyl),
2,2'-p-phenylenebis(1,3-benzoxazin-4-one),
2-[2-hydroxy-3-(3,4,5,6-tetrahydrophthalimidomethyl)-5-methylphenyl]benzotriazole, and polymers having a 2-hydroxyphenyl-2H-benzotriazole skeleton such as a copolymer of 2-(2'-hydroxy-5-methacryloxyethylphenyl)-2H-benzotriazole and a vinyl-based monomer copolymerizable with this monomer and a copolymer of 2-(2'-hydroxy-5-acryloxyethylphenyl)-2H-benzotriazole and a vinyl-based monomer copolymerizable with this monomer.

Hydroxyphenyltriazine-based ultraviolet absorbents as the ultraviolet absorbent include
2-(4,6-diphenyl-1,3,5-triazin-2-yl)-5-hexyloxyphenol,
2-(4,6-diphenyl-1,3,5-triazin-2-yl)-5-methyloxyphenol,
2-(4,6-diphenyl-1,3,5-triazin-2-yl)-5-ethyloxyphenol,
2-(4,6-diphenyl-1,3,5-triazin-2-yl)-5-propyloxyphenol and
2-(4,6-diphenyl-1,3,5-triazin-2-yl)-5-butyloxyphenol.
Further, compounds having a 2,4-dimethylphenyl group as the phenyl group of the above compounds such as 2-(4,6-bis(2,4-dimethylphenyl)-1,3,5-triazin-2-yl)-5-hexyloxyphenol may also be used.

Cyclic iminoester-based ultraviolet absorbents as the ultraviolet absorbent include
2,2'-p-phenylenebis(3,1-benzoxazin-4-one),
2,2'-(4,4'-diphenylene)bis(3,1-benzoxazin-4-one) and
2,2'-(2,6-naphthalene)bis(3,1-benzoxazin-4-one).

Cyanoacrylate-based ultraviolet absorbents as the ultraviolet absorbent include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

When the above ultraviolet absorbent has a radically polymerizable monomer compound structure, it may be a polymer type ultraviolet absorbent obtained by copolymerizing an ultraviolet absorbing monomer and/or an optically stable monomer having a hindered amine structure with a monomer such as an alkyl(meth)acrylate. Preferred examples of the above ultraviolet absorbing monomer include compounds containing a benzotriazole skeleton, benzophenone skeleton, triazine skeleton, cyclic iminoester skeleton or cyanoacrylate skeleton in the ester substituent of a (meth)acrylic acid ester.

Benzotriazole-based and hydroxyphenyltriazine-based ultraviolet absorbents are preferred in terms of ultraviolet absorption ability, and cyclic iminoeser-based and cyanoacrylate-based ultraviolet absorbents are preferred in terms of heat resistance and color. The above ultraviolet absorbents may be used alone or in combination of two or more.

The content of the ultraviolet absorbent is preferably 0.01 to 2 parts by weight, more preferably 0.02 to 2 parts by weight, much more preferably 0.03 to 1.5 parts by weight, particularly preferably 0.05 to 1 part by weight based on 100 parts by weight of the component A.

(i-4) Other Heat Stabilizers

The resin composition of the present invention may comprise another heat stabilizer except for the above phosphorus-based stabilizer and the above hindered phenol-based antioxidant. The other heat stabilizer is preferably used in combination with any one of the above stabilizer and the antioxidant, particularly preferably both of them. Preferred examples of the heat stabilizer include lactone-based stabilizers typified by a reaction product of 3-hydroxy-5,7-di-tert-butyl-furan-2-one and o-xylene (this stabilizer is detailed in JP-A 7-233160). This compound is marketed under the trade name of Irganox HP-136 (trademark, manufactured by CIBA SPECIALTY CHEMICALS) and may be used. A stabilizer prepared by mixing together the above compound, a phosphite compound and a hindered phenol compound is commercially available. A preferred example of this stabilizer is the Irganox HP-2921 of CIBA SPECIALTY CHEMICALS. This stabilizer mixture may also be used in the present invention. The content of the lactone-based stabilizer is preferably 0.0005 to 0.05 part by weight, more preferably 0.001 to 0.03 part by weight based on 100 parts by weight of the component A.

Other stabilizers include sulfur-containing stabilizers such as pentaerythritol tetrakis(3-mercaptopropionate), pentaerythritol tetrakis(3-laurylthiopropionate) and glycerol-3-stearyl thiopropionate. These stabilizers are effective especially when the resin composition is used for rotational molding. The content of the sulfur-containing stabilizer is preferably 0.001 to 0.1 part by weight, more preferably 0.01 to 0.08 part by weight based on 100 parts by weight of the component A.

(ii) Release Agent

The resin composition of the present invention may further comprise a known release agent such as a fatty acid ester, polyolefin-based wax, silicone compound, fluorine compound (such as fluorine oil typified by polyfluoroalkyl ethers), paraffin wax or beeswax in order to improve productivity at the time of molding and the dimensional accuracy of a molded article. Since the resin composition of the present invention has high flowability, a molded article having excellent pressure propagation and uniform distortion is obtained. Meanwhile, since its molding shrinkage factor is low, release resistance tends to become large with the result that the deformation of a molded article tends to occur at the time of release. The above problem is solved by mixing the above specific component without impairing the characteristic properties of the resin composition.

The fatty acid ester is an ester of an aliphatic alcohol and an aliphatic carboxylic acid. The aliphatic alcohol may be either a monohydric alcohol or a polyhydric alcohol having 2 or more hydroxyl groups. The number of carbon atoms of the alcohol is preferably 3 to 32, more preferably 5 to 30. The aliphatic carboxylic acid has preferably 3 to 32 carbon atoms, more preferably 10 to 30 carbon atoms. A saturated aliphatic carboxylic acid is particularly preferred. The fatty acid ester of the present invention is preferably a full ester as it is excellent in heat stability at a high temperature. The acid value of the fatty acid ester of the present invention is preferably not more than 20 (can be substantially "0"). The hydroxyl value of the fatty acid ester is preferably 0.1 to 30. Further, the iodine value of the fatty acid ester is preferably not more than 10 (can be substantially "0"). These properties can be obtained by methods specified in JIS K 0070.

Examples of the polyolefin-based wax include an ethylene homopolymer having a molecular weight of 1,000 to 10,000, α-olefin homopolymers or copolymers having 3 to 60 carbon atoms, and copolymers of ethylene and an α-olefin having 3 to 60 carbon atoms. The above molecular weight is a number average molecular weight measured in terms of standard polystyrene by GPC (gel permeation chromatography). The upper limit of the number average molecular weight is preferably 6,000, more preferably 3,000. The number of carbon atoms of the α-olefin component of the polyolefin-based wax is preferably not more than 60, more preferably not more than 40. Preferred examples of the α-olefin component include propylene, 1-butene, 1-hexene, 4-methyl-1-pentene and 1-octene. Preferred examples of the polyolefin-based wax include an ethylene homopolymer and copolymers of ethylene and an α-olefin having 3 to 60 carbon atoms. The content of the α-olefin having 3 to 60 carbon atoms is preferably not more than 20 mol %, more preferably not more than 10 mol %. Commercially available products so-called "polyethylene wax" are preferably used.

The content of the above release agent is preferably 0.005 to 5 parts by weight, more preferably 0.01 to 4 parts by weight, much more preferably 0.02 to 3 parts by weight based on 100 parts by weight of the component A.

(iii) Dye or Pigment

The resin composition of the present invention can provide molded articles having various designs when it further comprises various dyes or pigments. Examples of the dye or pigment used in the present invention include perylene-based dyes, coumalin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes and phthalocyanine-based dyes. When the resin composition of the present invention comprises a metallic pigment, a good metallic color can be obtained. The metallic pigment is preferably an aluminum powder. By blending a fluorescent brightener or a luminescent fluorescent dye other than the fluorescent brightener, a good design effect making use of a luminescent color can be provided.

Examples of the fluorescent dye (including a fluorescent brightener) used in the present invention include coumalin-based fluorescent dyes, benzopyran-based fluorescent dyes, perylene-based fluorescent dyes, anthraquinone-based fluorescent dyes, thioindigo-based fluorescent dyes, xanthene-based fluorescent dyes, xanthone-based fluorescent dyes, thioxanthene-based fluorescent dyes, thioxanthone-based fluorescent dyes, thiazine-based fluorescent dyes and diaminostilbene-based fluorescent dyes. Out of these, coumalin-based fluorescent dyes, benzopyran-based fluorescent dyes and perylene-based fluorescent dyes are preferred because they have high heat resistance and rarely deteriorate at the time of molding the polycarbonate resin.

The content of the above dye or pigment is preferably 0.00001 to 1 part by weight, more preferably 0.00005 to 0.5 part by weight based on 100 parts by weight of the component A.

(iv) Flame Retardant

The resin composition of the present invention comprises a compound which is known as a flame retardant except for the phosphorus-based flame retardant used as the component D. By blending a compound used as a flame retardant, not only flame retardancy but also antistatic performance, flowability, stiffness and heat stability are improved based on the properties of the compound.

Examples of the flame retardant include (1) organic metal salt-based flame retardants (such as organic sulfonic acid alkali (earth) metal salts, boric acid metal salt-based flame retardants and stannic acid metal salt-based flame retardants), (2) silicone-based flame retardants composed of silicone compounds, and (3) halogen-based flame retardants (such as brominated epoxy resins, brominated polystyrenes, brominated polycarbonates (including oligomers), brominated polyacrylates and chlorinated polyethylenes).

(iv-1) Organic Metal Salt-based Flame Retardant

The organic metal salt-based flame retardant is advantageous as heat resistance is almost retained and at least antistatic performance can be provided. The organic metal salt-based flame retardant which is most advantageously used in the present invention is a fluorine-containing organic metal salt compound. The fluorine-containing organic metal salt compound of the present invention refers to a metal salt compound comprising an anion component composed of an organic acid having a fluorine-substituted hydrocarbon group and a cation component composed of a metal ion. Preferred examples thereof include metal salts of a fluorine-substituted organic sulfonic acid, metal salts of a fluorine-substituted organic sulfuric acid ester, and metal salts of a fluorine-substituted organic phosphoric acid ester. The fluorine-containing organic metal salt compounds may be used alone or in combination of two or more. Out of these, metal salts of a fluorine-substituted organic sulfonic acid are preferred, and metal salts of a sulfonic acid having a perfluoroalkyl group are particularly preferred. The number of carbon atoms of the perfluoroalkyl group is preferably 1 to 18, more preferably 1 to 10, much more preferably 1 to 8.

The metal constituting the metal ion of the organic metal salt-based flame retardant is an alkali metal or an alkali earth metal. Examples of the alkali metal include lithium, sodium, potassium, rubidium and cesium. Examples of the alkali earth metal include beryllium, magnesium, calcium, strontium and barium. An alkali metal is more preferred. Therefore, the preferred organic metal salt-based flame retardant is an alkali metal salt of a perfluoroalkylsulfonic acid. When the requirement for transparency is higher, rubidium and cesium are preferred out of the above alkali metals. However, as they cannot be used for all purposes and it is difficult to purify them, they may become disadvantageous in terms of cost. Meanwhile, although lithium and sodium are advantageous in terms of cost and flame retardancy, they may become disadvantageous in terms of transparency. In consideration of these, an alkali metal contained in the perfluoroalkylsulfonic acid alkali metal salt may be selected for each purpose but a potassium salt of a perfluoroalkylsulfonic acid having good balance among properties is most preferred in all aspects. This potassium salt and a perfluoroalkylsulfonic acid alkali metal salt containing another alkali metal may be used in combination.

Examples of the perfluoroalkylsulfonic acid alkali metal salt include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. Out of these, potassium perfluorobutanesulfonate is particularly preferred.

The above fluorine-containing organic metal salt has a fluoride ion content measured by ion chromatography of preferably not more than 50 ppm, more preferably not more than 20 ppm, much more preferably not more than 10 ppm. As the fluoride ion content becomes lower, flame retardancy and light resistance become higher. The lower limit of the fluoride ion content can be substantially 0 but preferably about 0.2 ppm for practical purposes from the viewpoint of balance between the number of purifying steps and the effect.

The perfluoroalkylsulfonic acid alkali metal salt having the above fluoride ion content is purified as follows, for example. The perfluoroalkylsulfonic acid alkali metal salt is dissolved in ion exchange water in a weight ratio of 1:2 to 1:10 at 40 to 90° C. (preferably 60 to 85° C.). The perfluoroalkylsulfonic acid alkali metal salt is produced by a method in which a perfluoroalkylsulfonic acid is neutralized with a carbonate or hydroxide of an alkali metal or a method in which a perfluoroalkylsulfonyl fluoride is neutralized with a carbonate or hydroxide of an alkali metal (preferably by the latter method). The ion exchange water is particularly preferably water having an electric resistance of not less than 18 MΩ·cm. A solution containing the metal salt dissolved therein is stirred at the above temperature for 0.1 to 3 hours, preferably 0.5 to 2.5 hours. Thereafter, the solution is cooled to 0 to 40° C., preferably 10 to 35° C. A crystal is precipitated by cooling. The precipitated crystal is extracted by filtration. Thereby, a more preferred purified perfluoroalkylsulfonic acid alkali metal salt is produced.

The amount of the fluorine-containing organic metal salt compound is preferably 0.005 to 1.0 part by weight, more preferably 0.005 to 0.8 part by weight, much more preferably 0.008 to 0.5 part by weight based on 100 parts by weight of the component A. As the above range is more preferred, effects expected from the blending of the fluorine-containing organic metal salt (for example, flame retardancy and antistatic performance) are obtained, and a bad influence upon the light resistance of the polycarbonate resin composition becomes small.

Another organic metal salt-based flame retardant except for the above fluorine-containing organic metal salt compound is preferably a metal salt of an organic sulfonic acid containing no fluorine atom. Examples of the metal salt include alkali metal salts of an aliphatic sulfonic acid, alkali earth metal salts of an aliphatic sulfonic acid, alkali metal salts of an aromatic sulfonic acid and alkali earth metal salts of an aromatic sulfonic acid (all of them do not contain a fluorine atom).

The metal salts of an aliphatic sulfonic acid are preferably alkali (earth) metal salts of an alkylsulfonic acid which may be used alone or in combination of two or more (the term "alkali (earth) metal salt" means both of an alkali metal salt and an alkali earth metal salt). Preferred examples of the alkanesulfonic acid used in the alkali (earth) metal salts of an alkylsulfonic acid include methanesulfonic acid, ethanesulfonic acid, propanesulfonic acid, butanesulfonic acid, methylbutanesulfonic acid, hexanesulfonic acid, heptanesulfonic acid and octanesulfonic acid, all of which may be used alone or in combination of two or more.

The aromatic sulfonic acid used in the alkali (earth) metal salts of an aromatic sulfonic acid is at least one acid selected from the group consisting of a sulfonic acid of a monomer-like or polymer-like aromatic sulfide, sulfonic acid of an aromatic carboxylic acid and an ester, sulfonic acid of a monomer-like or polymer-like aromatic ether, sulfonic acid of an aromatic sulfonate, monomer-like or polymer-like aromatic sulfonic acid, monomer-like or polymer-like aromatic sulfonesulfonic acid, sulfonic acid of an aromatic ketone, heterocyclic sulfonic acid, sulfonic acid of an aromatic sulfoxide and condensate formed by the methylene type bonding of an aromatic sulfonic acid. They may be used alone or in combination of two or more.

The alkali (earth) metal salts of an aromatic sulfonic acid include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenylene oxide)polysulfonate, polysodium poly(1,3-phenylene oxide)polysulfonate, polysodium poly(1,4-phenylene oxide)polysulfonate, polypotassium poly(2,6-diphenylphenylene oxide)polysulfonate, lithium poly(2-fluoro-6-butylphenylene oxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, formalin condensate of sodium naphthalenesulfonate, and formalin condensate of sodium anthracenesulfonate.

The alkali (earth) metal salts of a sulfuric acid ester include alkali (earth) metal salts of a sulfuric acid ester of a monohydric and/or polyhydric alcohol. Examples of the sulfuric acid ester of a monohydric and/or polyhydric alcohol include methyl sulfuric acid esters, ethyl sulfuric acid esters, lauryl sulfuric acid esters, hexadecyl sulfuric acid esters, sulfuric acid esters of a polyoxyethylene alkylphenyl ether, mono-, di-, tri- and tetra-sulfuric acid esters of pentaerythritol, sulfuric acid esters of monoglyceride laurate, sulfuric acid esters of monoglyceride palmitate and sulfuric acid esters of monoglyceride stearate. Out of these alkali (earth) metal salts of a sulfuric acid ester, alkali (earth) metal salts of a lauryl sulfuric acid ester are preferred.

Other alkali (earth) metal salts include alkali (earth) metal salts of an aromatic sulfonamide such as saccharin, N-(p-tolylsulfonyl)-p-toluenesulfoimide, N—(N'-benzylaminocarbonyl)sulfanilimide and N-(phenylcarboxyl) sulfanilimide.

The metal salt of an organic sulfonic acid containing no fluorine atom is preferably an alkali (earth) metal salt, particularly preferably a potassium salt of an aromatic sulfonic acid. When an alkali (earth) metal salt of an aromatic sulfonic acid is contained, the content thereof is preferably 0.001 to 3 parts by weight, more preferably 0.005 to 2.5 parts by weight, much more preferably 0.01 to 2 parts by weight based on 100 parts by weight of the component A.

(iv-2) Silicone-based Flame Retardant

A silicone compound used as the silicone-based flame retardant improves flame retardancy by a chemical reaction at the time of combustion. As the compound may be used various compounds which have been proposed as flame retardants for aromatic polycarbonate resins. It is considered that the silicone compound provides a flame retarding effect to the polycarbonate resin due to the formation of a structure by the bonding of the silicone compound itself or to a component derived from the resin at the time of combustion or a reduction reaction at the time of forming the structure.

Therefore, it is preferred that the silicone compound should contain a highly active group for the reaction. More specifically, the silicone compound preferably contains a predetermined amount of at least one group selected from an alkoxy group and hydrogen (that is, Si—H group). The amount of the group (alkoxy group or Si—H group) is preferably 0.1 to 1.2 mol/100 g, more preferably 0.12 to 1 mol/100 g, much more preferably 0.15 to 0.6 mol/100 g. This amount is obtained by measuring the amount of hydrogen or alcohol formed per unit weight of the silicon compound by an alkali decomposition method. The alkoxy group is preferably an alkoxy group having 1 to 4 carbon atoms, particularly preferably a methoxy group.

In general, the structure of the silicone compound is constituted by combining the following four siloxane units arbitrarily.

M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$ D unit: bifunctional siloxane unit such as $(CH_3)_2SiO$, $H(CH_3)SiO$, $H_2SiO$, $H(C_6H_5)SiO$, $(CH_3)(CH_2=CH)SiO$ or $(C_6H_5)_2SiO$ T unit: trifunctional siloxane unit such as $(CH_3)SiO_{3/2}$, $(C_3H_7)SiO_{3/2}$, $HSiO_{3/2}$, $(CH_2=CH)SiO_{3/2}$ or $(C_6H_5)SiO_{3/2}$ Q unit: tetrafunctional siloxane unit represented by $SiO_2$ The structure of the silicone compound used in the silicone-based flame retardant is represented by $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ or $D_nT_pQ_q$. Out of these, the structure of the silicone compound is represented by preferably $M_mD_n$, $M_mT_p$, $M_mD_nT_p$ or $M_mD_nQ_q$, more preferably $M_mD_n$ or $M_mD_nT_p$.

The coefficients m, n, p and q in the above formulas are each an integer of 1 or more which indicates the polymerization degree of each siloxane unit. The total of the above coefficients is the average polymerization degree of the silicone compound. This average polymerization degree is in the range of preferably 3 to 150, more preferably 3 to 80, much more preferably 3 to 60, particularly preferably 4 to 40. The flame retardancy becomes more excellent as the above average polymerization degree becomes more preferred. As will be described hereinafter, the silicone compound containing a predetermined amount of an aromatic group is also excellent in transparency and color.

When any one of m, n, p and q is 2 or more, the number of the siloxane units having the coefficient may be 2 or more which differ in the bonded hydrogen atom or organic residue.

The silicone compound may have a linear or branched structure. The organic residue bonded to the silicon atom has preferably 1 to 30 carbon atoms, more preferably 1 to 20 carbon atoms. Examples of the organic residue include alkyl groups such as methyl group, ethyl group, propyl group, butyl group, hexyl group and decyl group, cycloalkyl groups such as cyclohexyl group, aryl groups such as phenyl group, and aralkyl groups such as tolyl group. The organic residue is preferably an alkyl group having 1 to 8 carbon atoms, alkenyl group or aryl group. The alkyl group is particularly preferably an alkyl group having 1 to 4 carbon atoms such as methyl group, ethyl group or propyl group.

The silicone compound used as the silicone-based flame retardant preferably contains an aryl group. More preferably, the content of the aromatic group (aromatic group content) represented by the following formula (10) is 10 to 70 wt % (preferably 15 to 60 wt %).

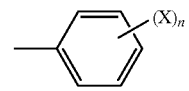
(10)

(In the formula (10), X is an OH group or monovalent organic residue having 1 to 20 carbon atoms. n is integer of 0 to 5. When n is 2 or more in the formula (10), X's may be different.)

The silicone compound used as the silicone-based flame retardant may contain a reactive group except for the above Si—H group and alkoxy group, and examples of the reactive group include amino group, carboxyl group, epoxy group, vinyl group, mercapto group and methacryloxy group.

The silicone compound having an Si—H group is preferably a silicone compound containing at least one of structural units represented by the following formulas (11) and (12).

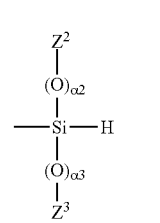
(11)

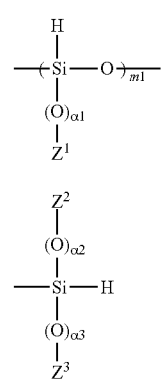
(12)

(In the formulas (11) and (12), $Z^1$ to $Z^3$ are each independently a hydrogen atom, monovalent organic residue having 1 to 20 carbon atoms, or compound represented by the following formula (13). $\alpha^1$ to $\alpha^3$ are each independently 0 or 1. m1 is 0 or an integer of 1 or more. When m1 is 2 or more in the formula (11), the recurring units may be different from each other.)

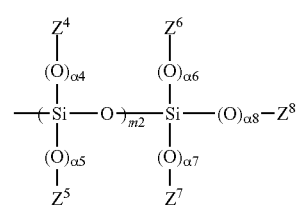
(13)

(In the formula (13), $Z^4$ to $Z^8$ are each independently a hydrogen atom or monovalent organic residue having 1 to 20 carbon atoms. $\alpha^4$ to $\alpha^8$ are each independently 0 or 1. m2 is 0 or an integer of 1 or more. When m2 is 2 or more in the formula (13), the recurring units may be different from each other.)

As the silicone compound used as the silicone-based flame retardant, the silicone compound having an alkoxy group is at least one compound selected from compounds represented by the following formulas (14) and (15).

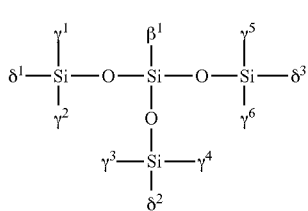
(14)

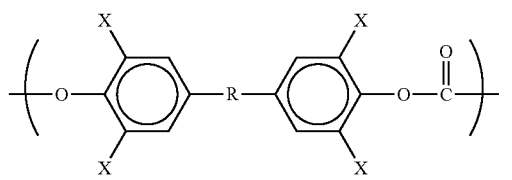
(16)

(In the formula (14), $\beta^1$ is a vinyl group, alkyl group having 1 to 6 carbon atoms, cycloalkyl group having 3 to 6 carbon atoms, or aryl group or aralkyl group having 6 to 12 carbon atoms. $\gamma^1$, $\gamma^2$, $\gamma^3$, $\gamma^4$, $\gamma^5$ and $\gamma^6$ are each an alkyl group or cycloalkyl group having 1 to 6 carbon atoms, or aryl group or aralkyl group having 6 to 12 carbon atoms, with proviso that at least one of the groups is an aryl group or aralkyl group. $\delta^1$, and $\delta^2$ and $\delta^3$ are each an alkoxy group having 1 to 4 carbon atoms.)

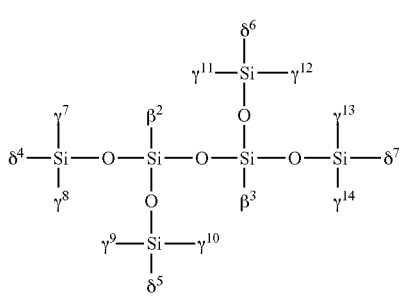
(15)

(In the formula (15), $\beta^2$ and $\beta^3$ are each a vinyl group, alkyl group having 1 to 6 carbon atoms, cycloalkyl group having 3 to 6 carbon atoms, or aryl group or aralkyl group having 6 to 12 carbon atoms. $\gamma^7$, $\gamma^8$, $\gamma^9$, $\gamma^{10}$, $\gamma^{11}$, $\gamma^{12}$, $\gamma^{13}$ and $\gamma^{14}$ are each an alkyl group having 1 to 6 carbon atoms, cycloalkyl group having 3 to 6 carbon atoms, or aryl group or aralkyl group having 6 to 12 carbon atoms, with proviso that at least one of the groups is an aryl group or aralkyl group. $\delta^4$, $\delta^5$, $\delta^6$ and $\delta^7$ are each an alkoxy group having 1 to 4 carbon atoms.)

The amount of the silicone-based flame retardant is preferably 0.1 to 10 parts by weight, more preferably 0.3 to 5 parts by weight based on 100 parts by weight of the component A.

(iv-3) Halogen-based Flame Retardant

As the halogen-based flame retardant, a brominated polycarbonate (including an oligomer) is particularly preferred. The brominated polycarbonate has excellent heat resistance and can greatly improve flame retardancy. The brominated polycarbonate used in the present invention is a brominated polycarbonate compound which contains a constituent unit represented by the following formula (16) in an amount of at least 60 mol %, preferably at least 80 mol %, particularly preferably substantially 100 mol % based on the total of all the constituent units.

(In the above formula (16), X is a bromine atom, R is an alkylene group having 1 to 4 carbon atoms, alkylidene group having 1 to 4 carbon atoms or —SO$_2$—.)

In the formula (16), R is preferably a methylene group, ethylene group, isopropylidene group or —SO$_2$—, particularly preferably an isopropylidene group.

The brominated polycarbonate contains a small amount of the residual chloroformate group terminal and has a terminal chlorine content of preferably not more than 0.3 ppm, more preferably not more than 0.2 ppm. The terminal chlorine content can be obtained by dissolving a sample in methylene chloride, adding 4-(p-nitrobenzyl)pyridine to be reacted with terminal chlorine (terminal chloroformate) and measuring the terminal chlorine with an ultraviolet visible spectrophotometer (U-3200 of Hitachi, Ltd.). When the terminal chlorine content is not more than 0.3 ppm, the heat stability of the polycarbonate resin composition becomes higher and further high-temperature molding becomes possible with the result that a resin composition having more excellent moldability is provided.

The amount of the residual hydroxyl group terminal contained in the brominated polycarbonate is preferably small. More specifically, the amount of the terminal hydroxyl group is preferably not more than 0.0005 mole, more preferably not more than 0.0003 mole based on 1 mole of the constituent unit of the brominated polycarbonate. The amount of the terminal hydroxyl group can be obtained by dissolving a sample in heavy chloroform and measuring the resulting solution by the $^1$H-NMR method. When the amount of the terminal hydroxyl group falls within the above range, the heat stability of the resin composition is further improved advantageously.

The specific viscosity of the brominated polycarbonate is preferably 0.015 to 0.1, more preferably 0.015 to 0.08. The specific viscosity of the brominated polycarbonate is calculated based on the above specific viscosity calculation formula used to calculate the viscosity average molecular weight of the polycarbonate resin which is the above-described component A of the present invention.

The amount of the halogen-based flame retardant is preferably 1 to 25 parts by weight, more preferably 1 to 20 parts by weight based on 100 parts by weight of the component A.

(v) Compound Having Heat Ray Absorbability

The resin composition of the present invention may comprise a compound having heat ray absorbability. Preferred examples of the compound include metal compounds having excellent near infrared absorbability such as phthalocyanine-based near-infrared absorbents, metal oxide-based near-infrared absorbents including ATO, ITO, iridium oxide and ruthenium oxide, and metal boride-based near-infrared absorbents including lanthanum boride, cerium boride and tungsten boride, and carbon fillers. As the phthalocyanine-based near-infrared absorbent, MIR-362 is commercially available from Mitsui Chemicals, Inc. and can be easily acquired. The carbon fillers include carbon black, graphite (including natural and artificial) and fullerene, out of which carbon black and graphite are preferred. They may be used alone or in combination of two or more.

The content of the phthalocyanine-based near-infrared absorbent is preferably 0.0005 to 0.2 part by weight, more preferably 0.0008 to 0.15 part by weight, much more preferably 0.001 to 0.1 part by weight based on 100 parts by weight of the component A. The content of each of the metal oxide-based near-infrared absorbent, the metal boride-based near-infrared absorbent and the carbon filler in the resin composition of the present invention is preferably 0.1 to 200 ppm (based on weight), more preferably 0.5 to 150 ppm.

(vi) Light Diffusing Agent

When the resin composition of the present invention is mixed with a light diffusing agent, a light diffusing effect can be provided. Examples of the light diffusing agent include polymer fine particles, inorganic fine particles having a low refractive index such as calcium carbonate and composites thereof. The polymer fine particles are fine particles which are already known as a light diffusing agent for polycarbonate resins. They are preferably acrylic crosslinked particles or silicone crosslinked particles typified by polyorganosilsesquioxane having a particle diameter of several μm. The shape of the light diffusing agent is spherical, disk-like, columnar or amorphous. The spherical shape does not need to be perfectly spherical and includes a deformed shape, and the columnar shape includes a cubic shape. The light diffusing agent is preferably spherical and more preferred as it is more uniform in particle size.

The content of the light diffusing agent is preferably 0.005 to 20 parts by weight, more preferably 0.01 to 10 parts by weight, much more preferably 0.01 to 5 parts by weight based on 100 parts by weight of the component A. Two or more light diffusing agents may be used in combination.

(vii) Light High-reflection White Pigment

When the resin composition of the present invention is mixed with a light high-reflection white pigment, a light reflection effect can be provided. As the white pigment, a titanium dioxide (especially titanium dioxide treated with an organic surface treating agent such as silicone) pigment is particularly preferred. The content of the light high-reflection white pigment is preferably 3 to 30 parts by weight, more preferably 8 to 25 parts by weight based on 100 parts by weight of the component A. Two or more light high-reflection white pigments may be used in combination.

(viii) Antistatic Agent

Since there is a case where antistatic performance is required for the resin composition of the present invention, the resin composition preferably comprises an antistatic agent in this case.

Examples of the antistatic agent include (1) organic sulfonic acid phosphonium salts such as arylsulfonic acid phosphonium salts typified by dodecylbenzenesulfonic acid phosphonium salts, and alkylsulfonic acid phosphonium salts, and boric acid phosphonium salts such as tetrafluoroboric acid phosphonium salts. The content of the phosphonium salt is suitably not more than 5 parts by weight, preferably 0.05 to 5 parts by weight, more preferably 1 to 4.5 parts by weight, much more preferably 1.5 to 4 parts by weight based on 100 parts by weight of the component A.

Other examples of the antistatic agent include (2) organic sulfonic acid alkali (earth) metal salts such as organic lithium sulfonate, organic sodium sulfonate, organic potassium sulfonate, organic cesium sulfonate, organic rubidium sulfonate, organic calcium sulfonate, organic magnesium sulfonate and organic barium sulfonate. The metal salts are also used as a flame retardant as described above. Specific examples of the metal salts include metal salts of dodecylbenzenesulfonic acid and metal salts of perfluoroalkanesulfonic acid. The content of the organic sulfonic acid alkali (earth) metal salt is suitably not more than 0.5 part by weight, preferably 0.001 to 0.4 part by weight, more preferably 0.005 to 0.3 part by weight based on 100 parts by weight of the component A. Alkali metal salts of potassium, cesium and rubidium are particularly preferred.

Still other examples of the antistatic agent include (3) organic sulfonic acid ammonium salts such as alkylsulfonic acid ammonium salts and arylsulfonic acid ammonium salts. The content of the ammonium salt is suitably not more than 0.05 part by weight based on 100 parts by weight of the component A.

Further examples of the antistatic agent include (4) polymers containing a poly(oxyalkylene)glycol component such as polyether ester amide as a constituent component. The content of the polymer is suitably not more than 5 parts by weight based on 100 parts by weight of the component A.

(ix) Other Additives

The resin composition of the present invention may comprise a thermoplastic resin except for the component A, rubber-like polymer, another flowability modifier, antibacterial agent, dispersant such as liquid paraffin, photocatalyst-based anti-fouling agent and photochromic agent.

Examples of the thermoplastic resin except for the component A include cyclohexanedimethanol copolymerized polyethylene terephthalate resin (so-called PET-G resin), polyethylene naphthalate resin, polybutylene naphthalate resin), polymethyl methacrylate resin (PMMA resin), cyclic polyolefin resins, polylactic acid resin, polycaprolactone resin, thermoplastic fluororesins (typified by vinylidene polyfluoride resin), and polyolefin resins (such as polyethylene resin, ethylene (α-olefin) copolymer resin, polypropylene resin, propylene-(α-olefin) copolymer resin). Examples of the rubber-like polymer include core-shell type graft copolymers and thermoplastic elastomers. The contents of the above thermoplastic resin and the rubber-like polymer are each preferably not more than 10 parts by weight, more preferably not more than 5 parts by weight based on 100 parts by weight of the component A.

(Production of Resin Composition)

To produce the resin composition of the present invention, any method is employed.

For example, the components A, B, C, D and E and optional additives are fully mixed together by means of pre-mixing means such as a twin-cylinder mixer, Henschel mixer, mechanochemical device or extrusion mixer, and the resulting pre-mixture is granulated by means of an extrusion granulator or briquetting machine as required, melt kneaded by means of a melt kneader typified by a vented double-screw extruder and then pelletized by means of a pelletizer.

Alternatively, the above components are supplied into a melt kneader typified by a vented double-screw extruder independently, or after some of the above components are pre-mixed together, the obtained pre-mixture is supplied into the melt kneader independently of the other components. To premix some of the above components, after components except for the component A are pre-mixed together, the resulting pre-mixture is mixed with the component A or directly supplied into the extruder.

To pre-mix the above components, for example, when the component A contains a powdery component, part of the powdery component is blended with the additives to prepare a master batch of the additives diluted with the powder, and the master batch is used. Further, one component may be supplied from a halfway position of the melt extruder independently. When the components to be mixed together include a liquid component, a liquid injector or a liquid adder may be used to supply it into the melt extruder.

An extruder having a vent from which water contained in the raw material and a volatile gas generated from the molten kneaded resin can be removed may be preferably used. A vacuum pump is preferably installed to discharge the generated water and volatile gas from the vent to the outside of the extruder efficiently. A screen for removing foreign matter contained in the extruded raw material may be installed in a zone before the die of the extruder to remove the foreign matter from the resin composition. Examples of the screen include a metal net, a screen changer and a sintered metal plate (such as a disk filter).

Examples of the melt kneader include a Banbury mixer, a kneading roll, a single-screw extruder and a multi-screw extruder having 3 or more screws, besides the double-screw extruder.

The resin extruded as described above is pelletized by directly cutting it or by forming it into a strand and cutting the strand with a pelletizer. When the influence of extraneous dust must be reduced at the time of pelletization, the atmosphere surrounding the extruder is preferably made clean. In the production of the above pellets, the narrowing of the form distribution of the pellets, the reduction of the number of miscut products and the amount of fine powders produced at the time of conveyance or transportation and the cutting of the number of cells (vacuum cells) formed in the strand or pellet can be suitably carried out by using various methods already proposed for polycarbonate resins for use in optical disks. Thereby, it is possible to increase the molding cycle and reduce the generation rate of a defect such as a silver streak.

The shape of the pellet may be columnar, rectangular column-like, spherical or other ordinary shape, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

Various products can be manufactured by obtaining molded articles by injection molding the pellet produced from the resin composition of the present invention as described above. For injection molding, not only ordinary molding techniques but also injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding techniques may be used. For molding, either one of cold-runner molding and hot-runner molding techniques may be selected.

The resin composition of the present invention may be formed into a profile extrusion molded article, a sheet or a film by extrusion molding. To mold a sheet or a film, inflation, calendering and casting techniques may also be used. Further, specific drawing operation may be used to mold it into a heat shrinkable tube. The resin composition of the present invention can be formed into a molded article by rotational molding or blow molding as well.

Thereby, a resin composition and a molded article both having excellent mechanical strength, weld strength and flame retardancy are provided. That is, according to the present invention, there is provided a molded article obtained by melt molding a resin composition comprising (A) 100 parts by weight of a resin component (component A) consisting of a polycarbonate-polydiorganosiloxane copolymer resin (component A-1) and an aromatic polycarbonate resin (component A-2), (B) 10 to 300 parts by weight of glass fibers having a flat cross section (component B) which have an average value of the long diameter of the fiber cross section of 10 to 50 μm and an average value of the ratio of the long diameter to the short diameter (long diameter/short diameter) of 1.5 to 8, (C) 5 to 25 parts by weight of an adhesion improving agent (component C), (D) 5 to 45 parts by weight of a phosphorus-based flame retardant (component D) and (E) 0.01 to 3 parts by weight of a fluorine-containing dripping inhibitor (component E), the content of the polydiorganosiloxane derived from the component A-1 in the resin composition being 0.05 to 4.00 wt %.

Molded articles obtained from the resin composition of the present invention are used for various purposes such as electronic and electric equipment parts, camera parts, OA equipment parts, precision machine parts, mechanical parts, vehicle parts, agricultural materials, conveyor containers, playing tools and miscellaneous goods, and particularly useful for housings for computers, notebook computers, ultrabooks, tablets and mobile phones. The resin composition of the present invention provides a remarkable industrial effect. The molded articles formed from the resin composition of the present invention may be subjected to various surface treatments. The term "surface treatments" as used herein means vapor deposition (such as physical vapor deposition or chemical vapor deposition), plating (such as electroplating, electroless plating or hot-dip plating), painting, coating and printing for the formation of a new layer on the surface layer of a resin molded article. Techniques which are used for ordinary polycarbonate resins can be used. The surface treatments include hard coating, water-repellent or oil-repellent coating, ultraviolet absorption coating, infrared absorption coating and metallizing (such as deposition). Hard coating is a particularly preferred and required surface treatment. Since the resin composition of the present invention has improved metal adhesion, vapor deposition and plating are also preferably used. A molded article having a metal layer can be used in electromagnetic shielding parts, conductive parts and antenna parts. The parts are particularly preferably in a sheet or film form.

(Method of Improving Weld Strength>

The present invention was made based on the finding that when the adhesion improving agent (component C) is added to the resin composition comprising a polycarbonate resin and glass fibers having a flat cross section, the weld strength, flame retardancy and stiffness of the resin composition are improved.

The present invention is a method of improving the weld strength of a glass-fiber-reinforced polycarbonate resin composition comprising (A) 100 parts by weight of a resin component (component A) consisting of a polycarbonate-polydiorganosiloxane copolymer resin (component A-1) and an aromatic polycarbonate resin (component A-2), (B) 10 to 300 parts by weight of glass fibers having a flat cross section (component B) which have an average value of the long diameter of the fiber cross section of 10 to 50 μm and an average value of the ratio of the long diameter to the short diameter (long diameter/short diameter) of 1.5 to 8, (D) 5 to 45 parts by weight of a phosphorus-based flame retardant (component D) and (E) 0.01 to 3 parts by weight of a fluorine-containing dripping inhibitor (component E), the content of the polydiorganosiloxane derived from the component A-1 in the resin composition being 0.05 to 4.00 wt %, wherein (C) 5 to 25 parts by weight of an adhesion improving agent (component C) is added based on 100 parts by weight of the resin component (component A).

The term "weld" as used herein means a boundary line formed when merging parts of two flows of a molten glass-fiber-reinforced polycarbonate resin composition flowing in a cavity are not completely dissolved into each other at the time of merging, and strength deterioration may occur due to the orientation unevenness of glass fibers caused by this weld. According to the present invention, this weld strength is improved.

EXAMPLES

An embodiment of the present invention that the inventors of the present invention think is the best at the moment is the integration of preferred ranges of the above requirements. For example, typical examples thereof are described in the following examples. As a matter of course, it is to be understood that the present invention is not limited to these examples.

(I) Evaluation of Glass-fiber-reinforced Polycarbonate Resin Composition (i) Content of Polydiorganosiloxane Component This was calculated by measuring the $^1$H-NMR spectrum of the resin composition with the JNM-AL400 of JEOL Ltd. to compare the integral ratio of peaks derived from the dihydric phenol (I) with the integral ratio of peaks derived from the hydroxyaryl-terminated polydiorganosiloxane (II).

(ii) Flexural Modulus, Flexural Strength

They were measured in accordance with ISO178 (measurement condition of 23° C.). A test piece was molded at a cylinder temperature of 280° C. and a mold temperature of 70° C. by means of an injection molding machine (SG-150U of Sumitomo Heavy Industries, Ltd.). The glass-fiber-reinforced polycarbonate resin composition of the present invention must have a flexural modulus of not less than 4 GPa and a flexural strength of not less than 100 MPa.

(iii) Weld Strength Retention

Flexural strength (with and without a weld) was measured by using an ASTM D638 type I test piece. The test piece having a weld was prepared by forming a weld in the center part of the test piece by filling from side gates provided on both sides of the test piece. The test piece without a weld was prepared by blocking one of the gates. The obtained test pieces were measured in accordance with ASTM D790 (measurement condition of 23° C.). The test pieces were molded at a cylinder temperature of 280° C. and a mold temperature of 70° C. by means of an injection molding machine (SG-150U of Sumitomo Heavy Industries, Ltd.). The weld strength retention was calculated based on the following equation from flexural strength with a weld and flexural strength without a weld measured by the above method.

Weld strength retention (%)=[(flexural strength with a weld)/(flexural strength without a weld)]×100

(iv) Flame Retardancy

The UL-94 flame retardancies of test pieces having a thickness of 0.5 mm and a thickness of 0.8 mm were evaluated. The test pieces were molded at a cylinder temperature of 280° C. and a mold temperature of 70° C. by means of an injection molding machine (SG-150U of Sumitomo Heavy Industries, Ltd.).

(v) Charpy Impact Strength

The Charpy impact strength of a test piece (size: 80 mm in length×10 mm in width×4 mm in thickness) molded under the same conditions as in (i) was measured in a 23° C. −50% RH environment by an ISO179-based method. As this numerical value is larger, the impact resistance of the resin composition is more excellent.

(vi) Tensile Break Stress

This was measured in accordance with ISO527 (measurement condition of 23° C.). A test piece was molded at a cylinder temperature of 280° C. and a mold temperature of 70° C. by means of an injection molding machine (SG-150U of Sumitomo Heavy Industries, Ltd.).

Examples 1 to 31, Comparative Examples 1 to 6

Amounts shown in Tables 1 and 2 of an aromatic polycarbonate resin (component A-2), a polycarbonate-polydiorganosiloxane copolymer resin (component A-1), glass fibers having a flat cross section (component B), an adhesion improving agent (component C) and additives (components D to F) were mixed together by means of a blender and melt kneaded together by means of a vented double-screw extruder to obtain a pellet. After a pre-mixture of the polycarbonate resin and the additives having a concentration 10 to 100 times higher than their mixing ratios was prepared, it was totally mixed by means of the blender. The TEX-30XSST of The Nippon Steel Works, Ltd. (completely interlocking type, unidirectional rotation, two screws) was used as the vented double-screw extruder. As for extrusion conditions, the delivery rate was 20 kg/h, the screw revolution was 150 rpm, the vacuum degree of the vent was 3 kPa, the extrusion temperature from the first feed port to the second feed port was 280° C., and the extrusion temperature from the second feed port to the die was 290° C.

The reinforcing filler (component F) was supplied from the second feed port by using the side feeder of the above extruder, and the rest of the polycarbonate resin and the rest of the additives were supplied into the extruder from the first feed port. The first feed port is a feed port farthest from the die, and the second feed port is situated between the die of the extruder and the first feed port. The obtained pellet was dried at 80° C. for 5 hours by means of a hot air circulation drier to mold a test piece for evaluation by means of an injection molding machine. Evaluations results are shown in Tables 1 and 2.

In Comparative Example 4, a strand was broken intermittently by surging, thereby making continuous production impossible.

Symbols in Tables 1 and 2 denote the following components.

(Component A-1)

PC-PDMS-1: polycarbonate-polydioganosiloxane copolymer resin (viscosity average molecular weight of 19,800, PDMS content of 4.2%, PDMS polymerization degree of 37)

PC-PDMS-2: polycarbonate-polydioganosiloxane copolymer resin (viscosity average molecular weight of 19,800, PDMS content of 8.4%, PDMS polymerization degree of 37)

PC-PDMS-3: polycarbonate-polydioganosiloxane copolymer resin (viscosity average molecular weight of 19,800, PDMS content of 4.2%, PDMS polymerization degree of 8)

PC-PDMS-4: polycarbonate-polydioganosiloxane copolymer resin (viscosity average molecular weight of 19,800, PDMS content of 4.2%, PDMS polymerization degree of 150)

(Component A-2)
PC: aromatic polycarbonate resin [polycarbonate resin powder having a viscosity average molecular weight of 19,800 formed from bisphenol A and phosgene by a commonly used method, Panlite L-1225WX of Teijin Chemicals Ltd.]
(Component B)
HGF-1: chopped glass fiber having a flat cross section (CSG 3PA-830 of Nitto Boseki Co., Ltd., long diameter of 28 μm, short diameter of 7 μm, cut length of 3 mm, epoxy-based sizing agent)
HGF-2: chopped glass fiber having a flat cross section (CSG 3PA-820 of Nitto Boseki Co., Ltd., long diameter of 28 μm, short diameter of 7 μm, cut length of 3 mm, urethane-based sizing agent)
GF: chopped glass fiber having a circular cross section (3PE937 of Nitto Boseki Co., Ltd., diameter of 13 μm, cut length of 3 mm, aminosilane surface treatment, epoxy-based sizing agent)
(Component C)
FP-1: bisphenol A type epoxy resin (jER1256 of Mitsubishi Chemical Co., Ltd., epoxy equivalent of 8,000 g/eq, Mw of 26,600)
FP-2: bisphenol A type phenoxy resin (PKHB of InChem Corporation, epoxy equivalent of 277 g/eq, Mw of 13,700)
GMA: glycidyl methacrylate (METABLEN P-1900 of Mitsubishi Rayon Co., Ltd., epoxy equivalent of 158 g/eq, Mw of 48,000)
PBT: polybutylene terephthalate (JURANEX 500FP EF202X of Polyplastics Co., Ltd., IV value of 0.85, terminal carboxyl group content of 55 eq/ton)
PET: polyethylene terephthalate (TRN-MTJ of Teijin Chemicals Ltd., IV value of 0.54, terminal carboxyl group content of 18 eq/ton)
PAR: polyarylate (IV value of 0.64, terminal carboxyl group content of 10 eq/ton)
(Component D)
FR-1: resorcinol bis(di-2,6-xylyl)phosphate (PX-200 of Daihachi Chemical Industry, Co., Ltd.)
FR-2: bisphenol A bis(diphenylphosphate) (CR-741 of Daihachi Chemical Industry, Co., Ltd.)
FR-3: phosphazene compound (FP-110 of Fushimi Pharmaceutical Co., Ltd.)
(Component E)
PTFE: polytetrafluoroethylene having fibril forming ability (Polyflon MPA FA500 of Daikin Industries, Ltd.)
(Component F)
TAL: talc (UPN HST0.8 of Hayashi-Kasei Co., Ltd.)
MIC: mica (KDM200 of Kinsei Matec Co., Ltd.)
WSN: wollastonite (NYGLOS4 of NYCO)

TABLE 1

| | | | Examples | 1 | 2 | 3 | 4 | 5 | 6 | 7 |
|---|---|---|---|---|---|---|---|---|---|---|
| Composition | Component A-1 | PC-PDMS-1 | Parts by weight | 20 | | 10 | | | | 10 |
| | | PC-PDMS-2 | | | 2 | | | | 55 | |
| | | PC-PDMS-3 | | | | | 20 | | | |
| | | PC-PDMS-4 | | | | | | 20 | | |
| | Component A-2 | PC | | 80 | 98 | 90 | 80 | 80 | 45 | 90 |
| | Component B | HGF-1 | | 110 | 110 | 110 | 110 | 110 | 10 | 300 |
| | | HGF-2 | | | | | | | | |
| | | GF | | | | | | | | |
| | Component C | GMA | | 8 | 8 | 8 | 8 | 8 | 8 | 8 |
| | | FP-1 | | | | | | | | |
| | | FP-2 | | | | | | | | |
| | | PET | | | | | | | | |
| | | PBT | | | | | | | | |
| | | PAR | | | | | | | | |
| | Component D | FR-1 | | 25 | 25 | 25 | 25 | 25 | 5 | 45 |
| | | FR-2 | | | | | | | | |
| | | FR-3 | | | | | | | | |
| | Component E | PTFE | | 1 | 1 | 1 | 1 | 1 | 0.5 | 1 |
| | Component F | TAL | | 4 | 4 | 4 | 4 | 4 | 2 | 4 |
| | | MIC | | | | | | | | |
| | | WSN | | | | | | | | |
| | Content of polydiorganosiloxane | | wt % | 0.34 | 0.07 | 0.34 | 0.34 | 0.34 | 3.68 | 0.18 |
| Evaluation results | Flexural modulus | | GPa | 15 | 15 | 15 | 15 | 15 | 4 | 20 |
| | Flexural strength | | MPa | 200 | 200 | 200 | 200 | 200 | 130 | 250 |
| | Weld strength retention | | % | 80 | 85 | 85 | 70 | 80 | 95 | 60 |
| | Flame retardancy | 0.5 mm in thickness | — | V-0 | V-1 | V-0 | V-0 | V-0 | V-1 | V-1 |
| | | 0.8 mm in thickness | — | V-0 | V-0 | V-0 | V-0 | V-0 | V-0 | V-0 |
| | Charpy impact strength | | KJ/m$^2$ | 11 | 11 | 11 | 10 | 13 | 7 | 7 |
| | Tensile break stress | | MPa | 150 | 150 | 150 | 150 | 150 | 120 | 170 |

| | | | Examples | 8 | 9 | 10 | 11 | 12 | 13 |
|---|---|---|---|---|---|---|---|---|---|
| Composition | Component A-1 | PC-PDMS-1 | Parts by weight | | | | | | |
| | | PC-PDMS-2 | | 10 | 10 | 10 | 10 | 10 | 10 |
| | | PC-PDMS-3 | | | | | | | |
| | | PC-PDMS-4 | | | | | | | |
| | Component A-2 | PC | | 90 | 90 | 90 | 90 | 90 | 90 |

TABLE 1-continued

| | | | | | | | | |
|---|---|---|---|---|---|---|---|---|
| Component B | HGF-1 | | | 110 | 60 | 90 | 110 | 140 |
| | HGF-2 | | 110 | | | | | |
| | GF | | | | | | | |
| Component C | GMA | | 8 | | | | | |
| | FP-1 | | | | | | | |
| | FP-2 | | | | | | | |
| | PET | | | | 8 | | | |
| | PBT | | | | | 8 | 8 | 8 | 8 |
| | PAR | | | | | | | |
| Component D | FR-1 | | 25 | 25 | 25 | 25 | 25 | 5 |
| | FR-2 | | | | | | | |
| | FR-3 | | | | | | | |
| Component E | PTFE | | 1 | 1 | 1 | 1 | 1 | 1 |
| Component F | TAL | | 4 | 4 | 4 | 4 | 4 | 2 |
| | MIC | | | | | | | |
| | WSN | | | | | | | |
| | Content of polydiorganosiloxane | wt % | 0.34 | 0.34 | 0.42 | 0.37 | 0.34 | 0.30 |
| Evaluation results | Flexural modulus | GPa | 15 | 15 | 10 | 13 | 15 | 16 |
| | Flexural strength | MPa | 190 | 200 | 200 | 200 | 200 | 200 |
| | Weld strength retention | % | 50 | 80 | 90 | 90 | 90 | 90 |
| Flame retardancy | 0.5 mm in thickness | — | V-0 | V-0 | V-0 | V-0 | V-0 | V-0 |
| | 0.8 mm in thickness | — | V-0 | V-0 | V-0 | V-0 | V-0 | V-0 |
| | Charpy impact strength | KJ/m$^2$ | 11 | 9 | 18 | 17 | 16 | 15 |
| | Tensile break stress | MPa | 140 | 150 | 150 | 150 | 150 | 150 |

| | | Examples | 14 | 15 | 16 | 17 | 18 | 19 |
|---|---|---|---|---|---|---|---|---|
| Composition | Component A-1 | PC-PDMS-1 | Parts by weight | | | | | |
| | | PC-PDMS-2 | | 10 | 10 | 10 | 10 | 10 | 10 |
| | | PC-PDMS-3 | | | | | | | |
| | | PC-PDMS-4 | | | | | | | |
| | Component A-2 | PC | | 90 | 90 | 90 | 90 | 90 | 90 |
| | Component B | HGF-1 | | 110 | 110 | 110 | 110 | 110 | 110 |
| | | HGF-2 | | | | | | | |
| | | GF | | | | | | | |
| | Component C | GMA | | | 5 | 25 | 8 | 8 | 8 |
| | | FP-1 | | | | | | | |
| | | FP-2 | | | | | | | |
| | | PET | | | | | | | |
| | | PBT | | | | | | | |
| | | PAR | | 8 | | | | | |
| | Component D | FR-1 | | 25 | 25 | 25 | | | 25 |
| | | FR-2 | | | | | 25 | | |
| | | FR-3 | | | | | | 25 | |
| | Component E | PTFE | | 1 | 1 | | 1 | 1 | 1 |
| | Component F | TAL | | 4 | 4 | 4 | 4 | 4 | |
| | | MIC | | | | | | | |
| | | WSN | | | | | | | 4 |
| | | Content of polydiorganosiloxane | wt % | 0.34 | 0.34 | 0.32 | 0.34 | 0.34 | 0.34 |
| Evaluation results | | Flexural modulus | GPa | 15 | 15 | 15 | 15 | 15 | 15 |
| | | Flexural strength | MPa | 200 | 200 | 210 | 210 | 210 | 210 |
| | | Weld strength retention | % | 75 | 70 | 90 | 90 | 90 | 90 |
| | Flame retardancy | 0.5 mm in thickness | — | V-0 | V-0 | V-0 | V-0 | V-0 | V-0 |
| | | 0.8 mm in thickness | — | V-0 | V-0 | V-0 | V-0 | V-0 | V-0 |
| | | Charpy impact strength | KJ/m$^2$ | 9 | 8 | 10 | 10 | 10 | 10 |
| | | Tensile break stress | MPa | 150 | 150 | 150 | 150 | 150 | 150 |

| | | Examples | 20 | 21 | 22 | 23 | 24 | 25 |
|---|---|---|---|---|---|---|---|---|
| Composition | Component A-1 | PC-PDMS-1 | Parts by weight | | | | | |
| | | PC-PDMS-2 | | 10 | 6 | 17 | 70 | 10 | 10 |
| | | PC-PDMS-3 | | | | | | | |
| | | PC-PDMS-4 | | | | | | | |
| | Component A-2 | PC | | 90 | 94 | 83 | 30 | 90 | 90 |
| | Component B | HGF-1 | | 110 | 10 | 300 | 110 | 110 | 110 |
| | | HGF-2 | | | | | | | |
| | | GF | | | | | | | |
| | Component C | GMA | | 8 | | | 8 | 8 | |
| | | FP-1 | | | | | | | |

TABLE 1-continued

|  |  |  |  |  |  |  |  |  |
|---|---|---|---|---|---|---|---|---|
|  |  | FP-2 |  |  |  |  |  |  |
|  |  | PET |  |  |  |  |  |  |
|  |  | PBT |  |  | 25 | 5 |  | 8 |
|  |  | PAR |  |  |  |  |  |  |
|  | Component D | FR-1 |  | 25 | 25 | 45 | 25 | 25 | 25 |
|  |  | FR-2 |  |  |  |  |  |  |  |
|  |  | FR-3 |  |  |  |  |  |  |  |
|  | Component E | PTFE |  | 1 | 0.5 | 2 | 1 | 1 | 1 |
|  | Component F | TAL |  |  | 2 | 7 | 4 | 8 |  |
|  |  | MIC |  |  |  |  |  |  |  |
|  |  | WSN |  | 4 |  |  |  |  |  |
|  | Content of polydiorganosiloxane | wt % | 0.34 | 0.31 | 0.31 | 2.37 | 0.33 | 0.34 |
| Evaluation results | Flexural modulus | GPa | 15 | 4 | 20 | 15 | 15 | 15 |
|  | Flexural strength | MPa | 210 | 130 | 250 | 200 | 200 | 200 |
|  | Weld strength retention | % | 90 | 95 | 60 | 75 | 70 | 90 |
|  | Flame retardancy | 0.5 mm in thickness | — | V-0 | V-0 | V-0 | V-0 | V-0 | V-1 |
|  |  | 0.8 mm in thickness | — | V-0 | V-0 | V-0 | V-0 | V-0 | V-0 |
|  | Charpy impact strength | KJ/$m^2$ | 10 | 6 | 7 | 9 | 7 | 16 |
|  | Tensile break stress | MPa | 150 | 120 | 170 | 150 | 140 | 150 |

|  |  |  | Examples |  |  |  |  |  |
|---|---|---|---|---|---|---|---|---|
|  |  |  |  | 26 | 27 | 28 | 29 | 30 | 31 |
| Composition | Component A-1 | PC-PDMS-1 | Parts by weight |  |  |  |  |  |  |
|  |  | PC-PDMS-2 |  | 10 | 10 | 10 | 10 | 10 | 10 |
|  |  | PC-PDMS-3 |  |  |  |  |  |  |  |
|  |  | PC-PDMS-4 |  |  |  |  |  |  |  |
|  | Component A-2 | PC |  | 90 | 90 | 90 | 90 | 90 | 90 |
|  | Component B | HGF-1 |  | 110 | 110 | 110 | 110 | 110 | 110 |
|  |  | HGF-2 |  |  |  |  |  |  |  |
|  |  | GF |  |  |  |  |  |  |  |
|  | Component C | GMA |  |  |  |  |  |  |  |
|  |  | FP-1 |  | 8 |  | 8 | 8 |  |  |
|  |  | FP-2 |  |  | 8 |  |  | 8 | 8 |
|  |  | PET |  |  |  |  |  |  |  |
|  |  | PBT |  |  |  |  |  |  |  |
|  |  | PAR |  |  |  |  |  |  |  |
|  | Component D | FR-1 |  | 25 | 25 |  |  |  |  |
|  |  | FR-2 |  |  |  | 25 |  | 25 |  |
|  |  | FR-3 |  |  |  |  | 25 |  | 25 |
|  | Component E | PTFE |  | 1 | 1 | 1 | 1 | 1 | 1 |
|  | Component F | TAL |  | 4 | 4 | 4 | 4 | 4 | 4 |
|  |  | MIC |  |  |  |  |  |  |  |
|  |  | WSN |  |  |  |  |  |  |  |
|  | Content of polydiorganosiloxane | wt % | 0.34 | 0.34 | 0.34 | 0.34 | 0.34 | 0.34 |
| Evaluation results | Flexural modulus | GPa | 15 | 15 | 15 | 15 | 15 | 15 |
|  | Flexural strength | MPa | 210 | 200 | 210 | 210 | 200 | 200 |
|  | Weld strength retention | % | 90 | 85 | 90 | 90 | 85 | 85 |
|  | Flame retardancy | 0.5 mm in thickness | — | V-0 | V-0 | V-0 | V-0 | V-0 | V-0 |
|  |  | 0.8 mm in thickness | — | V-0 | V-0 | V-0 | V-0 | V-0 | V-0 |
|  | Charpy impact strength | KJ/$m^2$ | 19 | 18 | 10 | 10 | 18 | 18 |
|  | Tensile break stress | MPa | 160 | 160 | 150 | 150 | 160 | 160 |

TABLE 2

|  |  |  | Comparative Examples |  |  |  |  |  |
|---|---|---|---|---|---|---|---|---|
|  |  |  |  | 1 | 2 | 3 | 4 | 5 | 6 |
| Composition | Component A-1 | PC-PDMS-1 | Parts by weight |  |  |  |  |  |  |
|  |  | PC-PDMS-2 |  |  | 70 | 10 | 10 | 6 | 17 |
|  |  | PC-PDMS-3 |  |  |  |  |  |  |  |
|  |  | PC-PDMS-4 |  |  |  |  |  |  |  |
|  | Component A-2 | PC |  | 100 | 30 | 90 | 90 | 94 | 83 |
|  | Component B | HGF-1 |  | 110 | 7 | 350 |  | 10 | 300 |
|  |  | HGF-2 |  |  |  |  |  |  |  |
|  |  | GF |  |  |  |  | 110 |  |  |
|  | Component C | GMA |  | 8 | 8 | 8 | 8 |  |  |
|  |  | FP-1 |  |  |  |  |  |  |  |
|  |  | FP-2 |  |  |  |  |  |  |  |

TABLE 2-continued

| Comparative Examples | | | | 1 | 2 | 3 | 4 | 5 | 6 |
|---|---|---|---|---|---|---|---|---|---|
| | | PET | | | | | | | |
| | | PBT | | | | | | 35 | 3 |
| | | PAR | | | | | | | |
| | Component D | FR-1 | | 25 | 25 | 25 | 25 | 25 | 45 |
| | | FR-2 | | | | | | | |
| | | FR-3 | | | | | | | |
| | Component E | PTFE | | 1 | 1 | 1 | 1 | 0.5 | 2 |
| | Component F | TAL | | 4 | 4 | 8 | 4 | 2 | 7 |
| | | MIC | | | | | | | |
| | | WSN | | | | | | | |
| | Content of polydiorganosiloxane | | wt % | 0.00 | 4.11 | 0.17 | 0.34 | 0.29 | 0.31 |
| Evaluation results | Flexural modulus | | GPa | 15 | 2 | Continuous production impossible | 12 | 4 | 20 |
| | Flexural strength | | MPa | 200 | 95 | | 185 | 130 | 250 |
| | Weld strength retention | | % | 90 | 97 | | 40 | 95 | 40 |
| | Flame retardancy | 0.5 mm in thickness | | — | V-2 | V-1 | | V-1 | V-2 | V-0 |
| | | 0.8 mm in thickness | | — | V-2 | V-1 | | V-1 | V-2 | V-0 |
| | Charpy impact strength | | KJ/m² | 8 | 15 | | 10 | 5 | 7 |
| | Tensile break stress | | MPa | 150 | 100 | | 135 | 145 | 155 |

Effect of the Invention

The resin composition of the present invention has excellent weld strength and stiffness as well as high flame retardancy.

INDUSTRIAL APPLICABILITY

The resin composition of the present invention is widely useful in various fields such as buildings, construction materials, agricultural materials, marine materials, vehicles, electric and electronic equipment, machinery and others, especially housings for computers, notebook computers, ultrabook, tablets and mobile phones.

The invention claimed is:

1. A glass-fiber-reinforced polycarbonate resin composition comprising:
   (A) 100 parts by weight of a resin component (component A) consisting of a polycarbonate-polydiorganosiloxane copolymer resin (component A-1) and an aromatic polycarbonate resin (component A-2);
   (B) 10 to 300 parts by weight of glass fibers having a flat cross section (component B) which have an average value of a long diameter of the fiber cross section of 10 to 50 μm and an average value of a ratio of the long diameter to a short diameter (long diameter/short diameter) of 1.5 to 8;
   (C) 5 to 25 parts by weight of an adhesion improving agent (component C), wherein the component C is at least one resin selected from the group consisting of a phenoxy resin, an epoxy resin, and a polymer consisting of glycidyl methacrylate units;
   (D) 5 to 45 parts by weight of a phosphorus-based flame retardant (component D); and
   (E) 0.01 to 3 parts by weight of a fluorine-containing dripping inhibitor (component E),
   wherein the content of the polydiorganosiloxane in component A-1 in the resin composition is 0.05 to 0.34 wt %.

2. The resin composition according to claim 1, wherein the component A-1 is a polycarbonate-polydiorganosiloxane copolymer resin composed of
   (i) a polycarbonate block derived from a dihydric phenol represented by the following formula (1),

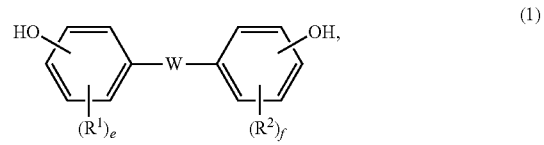

wherein:
   $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group, when there are a plurality of $R^1$'s and a plurality of $R^2$'s, they may be the same or different,
   "e" and "f" are each an integer of 1 to 4, and
   W is a single bond or at least one group selected from the group consisting of

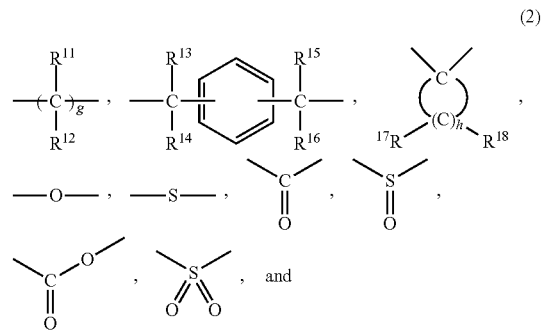

-continued

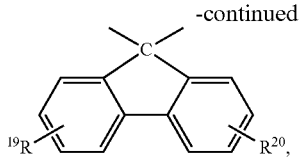

wherein $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms, $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, when there are a plurality of $R^{19}$'s and a plurality of $R^{20}$'s, they may be the same or different, "g" is an integer of 1 to 10, and "h" is an integer of 4 to 7, and (ii) a polydiorganosiloxane block derived from a dihydric phenol represented by the following formula (3),

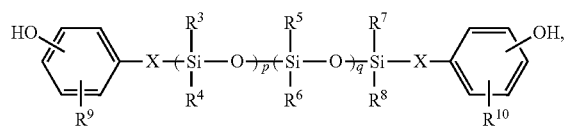

(3)

wherein:

$R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently a hydrogen atom, halogen atom, alkyl group having 1 to 10 carbon atoms or alkoxy group having 1 to 10 carbon atoms, "p" is a natural number, "q" is 0 or natural number, and (p+q) is a natural number of less than 100, and X is a divalent aliphatic group having 2 to 8 carbon atoms.

3. A molded article obtained by molding the resin composition of claim 2.

4. The resin composition according to claim 1, wherein the component D is at least one phosphorus-based flame retardant selected from the group consisting of phosphoric acid esters, condensation phosphoric acid esters and phosphazene compounds.

5. A molded article obtained by molding the resin composition of claim 4.

6. The resin composition according to claim 1, wherein the glass fibers are converged by an epoxy resin.

7. A molded article obtained by molding the resin composition of claim 6.

8. The resin composition according to claim 1, which further comprises (F) 0.1 to 10 parts by weight of a silicate compound (component F) based on 100 parts by weight of the component A.

9. The resin composition according to claim 8, wherein the component F is at least one silicate compound selected from the group consisting of talc, mica and wollastonite.

10. A molded article obtained by molding the resin composition of claim 9.

11. A molded article obtained by molding the resin composition of claim 8.

12. A molded article obtained by molding the resin composition of claim 1.

13. A method of improving the weld strength of a glass-fiber-reinforced polycarbonate resin composition, said method comprising:

combining a polycarbonate resin composition comprising:
(A) 100 parts by weight of a resin component (component A) consisting of a polycarbonate-polydiorganosiloxane copolymer resin (component A-1) and an aromatic polycarbonate resin (component A-2),
(B) 10 to 300 parts by weight of glass fibers having a flat cross section (component B) which have an average value of a long diameter of the fiber cross section of 10 to 50 μm and an average value of a ratio of the long diameter to a short diameter (long diameter/short diameter) of 1.5 to 8,
(D) 5 to 45 parts by weight of a phosphorus-based flame retardant (component D), and
(E) 0.01 to 3 parts by weight of a fluorine-containing dripping inhibitor (component E),
wherein the content of the polydiorganosiloxane in the component A-1 in the resin composition is 0.05 to 0.34 wt %, with
(C) 5 to 25 parts by weight of an adhesion improving agent (component C), wherein the component C is at least one resin selected from the group consisting of a phenoxy resin, an epoxy resin, and a polymer consisting of glycidyl methacrylate units, based on 100 parts by weight of the resin component (component A).

* * * * *